United States Patent
Kiyohara et al.

[11] Patent Number: 5,960,027
[45] Date of Patent: Sep. 28, 1999

[54] APPARATUS FOR CONTROLLING ARC DEFLECTION IN AN ARC FURNACE

[75] Inventors: Toyohiko Kiyohara; Takayuki Asoh; Yuji Haraguchi; Kazuya Toi, all of Tokyo, Japan

[73] Assignee: Mitsubishi Denki Kabushiki Kaisha, Tokyo, Japan

[21] Appl. No.: 08/710,434

[22] Filed: Sep. 17, 1996

[30] Foreign Application Priority Data

Sep. 19, 1995 [JP] Japan ................................. 7-240083

[51] Int. Cl.$^6$ ................................................. H05B 7/144
[52] U.S. Cl. ........................... 373/107; 373/103; 373/105
[58] Field of Search ................................ 373/102, 103, 373/107, 108, 64, 72

[56] References Cited

U.S. PATENT DOCUMENTS

| | | | |
|---|---|---|---|
| 2,652,440 | 9/1953 | Simmons | 373/64 |
| 3,683,094 | 8/1972 | Schlienger | 373/64 |
| 4,038,483 | 7/1977 | Stenkvist | 373/107 |
| 4,110,546 | 8/1978 | Stenkvist | 373/107 |
| 4,149,024 | 4/1979 | Stenkvist et al. | 373/64 |
| 4,495,625 | 1/1985 | Heberlein et al. | 373/107 |
| 4,581,745 | 4/1986 | Mathews et al. | 373/107 |
| 4,931,702 | 6/1990 | Voronin et al. | 373/107 |
| 5,138,630 | 8/1992 | Suga | 373/107 |
| 5,317,591 | 5/1994 | Stenkvist | 373/107 |
| 5,381,441 | 1/1995 | Nix | 373/108 |
| 5,526,374 | 6/1996 | Uebber | 373/107 |

FOREIGN PATENT DOCUMENTS

| | | |
|---|---|---|
| 0600362 | 6/1994 | European Pat. Off. . |
| 2558879 | 7/1976 | Germany . |
| 4035233 | 5/1991 | Germany . |
| 224290 | 2/1990 | Japan . |
| WO9222181 | 12/1992 | WIPO . |

OTHER PUBLICATIONS

Nanjo, T., and H. Yoshida. "Section 4: Arc Phenomenon in DC Arc Furnace (4)", *Industrial Heating*. (partial translation).

*Primary Examiner*—Tu B. Hoang
*Attorney, Agent, or Firm*—Leydig, Voit & Mayer

[57] ABSTRACT

An arc control apparatus for a DC arc furnace provides an additional magnetic field which prevents a discharged arc from shifting outward at an arc generating point due to the influences of a magnetic field generated by a feeder circuit, thus directing the arc discharge vertically downward. The arc control apparatus includes an arc furnace in which an object to be melted is disposed. A movable electrode is disposed in the arc furnace for movement relative to the object. A feeder circuit including a power supply and a feeding conductor is connected to the movable electrode and the arc furnace for supplying a voltage therebetween from the power supply through the feeding conductor to generate an arc whereby the object is dissolved. An auxiliary coil is disposed outside and in the vicinity of the arc furnace and connected to the feeder circuit for generating a counter magnetic field in a direction to cancel a magnetic field which is generated at a point of generation of the arc by means of the feeder circuit.

15 Claims, 15 Drawing Sheets

APPARATUS FOR CONTROLLING ARC DEFLECTION IN AN ARC FURNACE

BACKGROUND OF THE INVENTION

1. Field of the Invention

The present invention relates to an arc control apparatus which controls the deflection of a DC arc caused by the influence of an electromagnetic force generated by a feeder circuit of a DC arc furnace, thereby melting an object in the furnace by evenly discharging the DC arc to the object.

2. Description of the Related Art

A large-current DC arc furnace usually suffers from the problem of the deflection of a heating arc radiated to an object to be melted. The deflection of the DC arc is attributable to the magnetic field generated by a feeder circuit which supplies electric power to the electrode for generating DC arcs and an electromagnetic force generated by the current of the DC arc itself. A deflected DC arc prevents uniform melting of the object in the DC arc furnace. Specifically, the deflected arc locally increases the thermal load on the wall of the furnace during the flat bath phase, leading to deterioration in electric power and refractory materials. This is obvious from the description given on page 28 of industrial Heating "Arc Phenomenon in DC Arc Furnace (4)" written by Nanjo and Yoshida.

Hence, various corrective measures have been proposed to solve the arc deflection problem. FIG. 24 shows the configuration of the feeder circuit in a conventional DC arc furnace which has been disclosed, for example, in Japanese Utility Model Laid-Open No. 2-24290. As illustrated, in the feeder circuit, a smoothing reactor 4 is connected to the negative electrode (−) of the DC output terminal of a thyristor converter 2, which converts the AC power supplied from a furnace transformer 1 into DC power, via a feeding conductor 3. The smoothing reactor 4 is connected to a movable electrode 6 which has a distal end thereof projecting into a DC arc furnace 5.

The positive electrode (+) of the thyristor converter 2 is connected to a furnace bottom electrode 7 of the DC arc furnace 5 through a feeding conductor 3'. The feeding conductor 3' is bent near the furnace bottom electrode 7 in the direction in which the DC arc is deflected by the electromagnetic force generated by the magnetic field created by the feeder circuit to the right, i.e. away from the furnace core in the figure, then it is bent vertically further away from the furnace before it is bent back toward the furnace core to be connected to the positive electrode (+) of the DC output terminal of the thyristor converter 2. The movable electrode 6 is supported by a holder arm 10 that is operable to move up and down.

In the feeder circuit comprising the feeding conductors 3, 3' and circuit elements 4, 2, feeding circuit F-G-A-B-C-D comprises section F-G connecting the holder arm 10 and the negative electrode (−) of the thyristor converter 2, loop A-D in loop A-E connecting the positive electrode (+) of the thyristor converter 2 through the feeding conductor 3' and the furnace bottom electrode 7. In loop A-E, section D-E serves as feeder circuit D-E.

The operation of a device illustrated in FIG. 24 is described below. The moment the DC power from the thyristor converter 2 is supplied between the movable electrode 6 and the furnace bottom electrode 7, whereby current flows in the direction of arrow Y to generate magnetic field B1. In feeder circuit D-E, currents flow in the direction of arrow X, i.e. in the opposite direction from feeder circuit F-G-A-B-C-D, generating magnetic field B2. In this case, the magnetic field B2 produced by feeder circuit D-E is in the direction opposite from magnetic field B1 generated by feeder circuit F-G-A-B-C-D; therefore, magnetic field B2 works in the direction for weakening magnetic field B1. Thus the electromagnetic force applied to the DC arc is weakened by feeder circuit F-G-A-B-C-D and the deflection of the DC arc toward the furnace wall is decreased.

Since the feeder circuitry of the conventional DC arc furnace is configured as described above, magnetic field B1 produced by feeder circuit F-G-A-B-C-D is reduced by magnetic field B2 created by feeder circuit D-E which is arranged horizontally. Magnetic field B1, however, cannot be fully cancelled and the electromagnetic force, although small, remains which and works to cause the DC arc to shift horizontally from the vicinity of the arc generating point to the outside of the feeder circuit.

The magnitude of the residual electromagnetic force is not negligible in a large-current arc furnace of about 100 KA. However, another problem associated with the above described devices is that the discharging direction cannot be controlled at will with respect to a scrap, an object 11 to be melted, preventing quick, efficient and uniform melting of the object 11.

SUMMARY OF THE INVENTION

The present invention has been made with a view toward solving the problems stated above and it is an object of the present invention to provide an arc control apparatus which is capable of substantially cancelling a magnetic field generated at the arc generating point of the movable electrode by means of a feeder circuit means.

Another object of the present invention is to provide an arc control apparatus which is capable of controlling the direction of arc discharge at will regardless of the wiring direction of the feeder circuit, thus enabling an object to be melted uniformly.

According to one aspect of the invention, there is provided an arc control apparatus comprising:

an arc furnace in which an object to be melted is disposed;

a movable electrode disposed in the arc furnace for movement relative to the object;

feeder circuit means including power supply means and feeding conductor means connected to the movable electrode and the arc furnace for supplying a voltage therebetween from the power supply means through the feeding conductor means to generate an arc whereby the object is melted; and auxiliary coil means disposed outside and in the vicinity of the arc furnace and connected to the feeder circuit means for generating a counter magnetic field in a direction to cancel a magnetic field which is generated at a point of generation of the arc by means of the feeder circuit means.

In a preferred form of the invention, the auxiliary coil means comprises an auxiliary coil disposed near the arc furnace.

In another preferred form of the invention, the auxiliary coil means comprises a plurality of auxiliary coils disposed around the arc furnace so as to generate a total magnetic field cancelling the magnetic field which is generated at the arc generating point by the feeding conductor means.

In a further preferred form of the invention, the auxiliary coil means comprises a first auxiliary coil and a second auxiliary coil disposed in a face-to-face relation with respect to each other with the arc furnace interposed therebetween.

In a further preferred form of the invention, the first and second auxiliary coils have respective planes disposed on opposite sides of the arc furnace in parallel with respect to each other.

In a further preferred form of the invention, the first and second auxiliary coils have respective planes disposed on opposite sides of the arc furnace in an anti-parallel relation with respect to each other having a predetermined angle formed therebetween.

In a further preferred form of the invention, the auxiliary coil means comprises a portion of the feeding conductor means wound to form a coil or coils.

In a further preferred form of the invention, the power supply means comprises a plurality of power supplies, and the feeding conductor means comprises a plurality of feeding conductors each connecting between a corresponding one of the power supplies and a corresponding one of the auxiliary coils, the feeding conductors being connected in parallel with respect to each other.

In a further preferred form of the invention, the auxiliary coil means comprises a first auxiliary coil adapted to generate a magnetic field in a direction opposite that of the magnetic field generated at the arc generating point of the movable electrode by the feeding conductor means, and a second auxiliary coil disposed in a face-to-face relation with respect to the first auxiliary coil and adapted to generate a magnetic field in the same direction as that of the magnetic field generated at the arc generating point by the feeding conductor means; the power supply means comprises a first power supply and a second power supply; and the feeding conductor means comprises a first feeding conductor connected between the first power supply and the first auxiliary coil, and a second feeding conductor connected between the second power supply and the second auxiliary coil, the first and second feeding conductors being connected in parallel with respect to each other, wherein the first and second auxiliary coils are disposed in a face-to-face relation with respect to each other with the arc furnace interposed therebetween so that the magnetic field produced at the arc generating point by the feeding conductor means can be substantially cancelled by the magnetic fields produced by the first and second auxiliary coils.

In a further preferred form of the invention, the arc control apparatus further comprises coil moving means for moving the auxiliary coil means in a vertical direction relative to the arc furnace as the movable electrode moves up and down.

In accordance with another aspect of the present invention, there is provided an arc control apparatus comprising:

an arc furnace in which an object to be melted is disposed;

a movable electrode disposed in the arc furnace for movement relative to the object;

feeder circuit means including power supply means and feeding conductor means connected to the movable electrode and the arc furnace for supplying a voltage therebetween from the power supply means through the feeding conductor means to generate an arc whereby the object is melted; and auxiliary coil means disposed outside and in the vicinity of the arc furnace and connected to the feeder circuit means for generating, together with a magnetic filed generated by the feeding conductor means, a magnetic field in a esired direction.

In a further preferred form of the invention, the auxiliary coil means comprises a plurality of auxiliary coils disposed around the arc furnace.

In a further preferred form of the invention, the feeder circuit means comprises first through fourth feeder circuits connected in parallel with respect to each other and each including a power supply and a feeding conductor serially connected to each other; and the auxiliary coil means comprises:

a first auxiliary coil connected to the first feeder circuit for generating a magnetic field in a direction opposite that of a magnetic field generated at the arc generating point of the movable electrode by the feeder circuit means;

a second auxiliary coil connected to the second feeder circuit for generating a magnetic field in the same direction as that of the magnetic field generated at the arc generating point of the movable electrode by the feeder circuit means;

a third auxiliary coil connected to the third feeder circuit for generating a magnetic field in a direction perpendicular to the magnetic field generated at the arc generating point of the movable electrode by the feeder circuit means; and a fourth auxiliary coil connected to the fourth feeder circuit for generating a magnetic field in a direction opposite the magnetic field generated by the third auxiliary coil as well as perpendicular to the magnetic field generated by the feeder circuit means;

wherein the first and second auxiliary coils are disposed in a face-to-face relation with respect to each other with the arc furnace interposed therebetween so as to generate, together with the magnetic field generated by the feeding conductor means, a first combined magnetic field in a direction parallel to the magnetic field generated at the arc generating point of the movable electrode by the feeding conductor means; and the third and fourth auxiliary coils are disposed in a face-to-face relation with respect to each other with the arc furnace interposed therebetween so as to generate a second combined magnetic field in a direction perpendicular to the magnetic field generated at the arc generating point of the movable electrode by the feeder circuit;

whereby the first and second combined magnetic fields are combined to provide a third combined magnetic field.

In a further preferred form of the invention, the arc control apparatus further comprises coil moving means for moving the auxiliary coil means in a vertical direction relative to the arc furnace as the movable electrode moves up and down.

In accordance with a further aspect of the invention, there is provided an arc control apparatus comprising:

an arc furnace in which an object to be melted is disposed;

a movable electrode disposed in the arc furnace for movement relative to the object; and a plurality of feeder circuits each including a power supply and a feeding conductor and connected between the movable electrode and the arc furnace for supplying a voltage therebetween from the respective power supplies through the corresponding feeding conductors to generate an arc whereby the object is melted;

wherein the feeder circuits are connected in parallel between the movable electrode and the arc furnace in such a manner that magnetic fields generated at the arc generating point of the movable electrode by the feeding conductors may be mutually cancelled out.

In a further preferred form of the invention, the arc control apparatus further comprises means for controlling the magnitude of a DC current supplied to the respective feeder circuits so as to allow the arc to be led into any desired direction.

In a further preferred form of the invention, the feeder circuits are disposed in pairs in an opposed relation with respect to each other with the arc furnace interposed therebetween so as to mutually cancel the magnetic fields with each other, which are produced at the arc generating point of the movable electrode by the feeding conductors.

In a further preferred form of the invention, the feeder circuits are disposed at intervals of 90 degrees around the arc furnace so as to mutually cancel the magnetic fields with each other, which are produced at the arc generating point of the movable electrode by the feeding conductors.

DESCRIPTION OF THE PREFERRED EMBODIMENTS

The embodiments will now be described in detail with reference to FIG. 1 through FIG. 23.

First Embodiment

Figure 1:
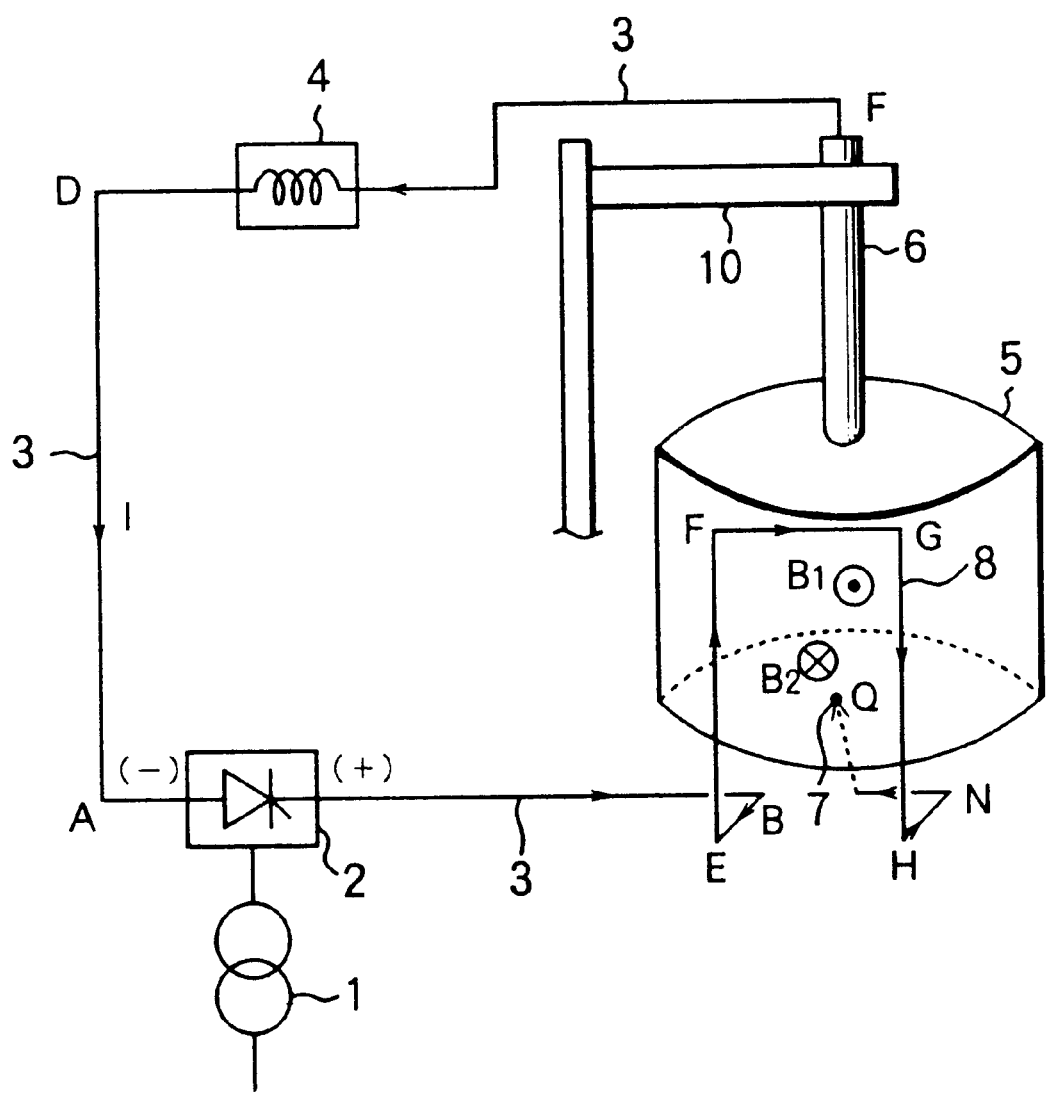
FIG. 1 is a schematic diagram illustrative of a first embodiment of an arc control apparatus in accordance with the invention.
Figure 24:
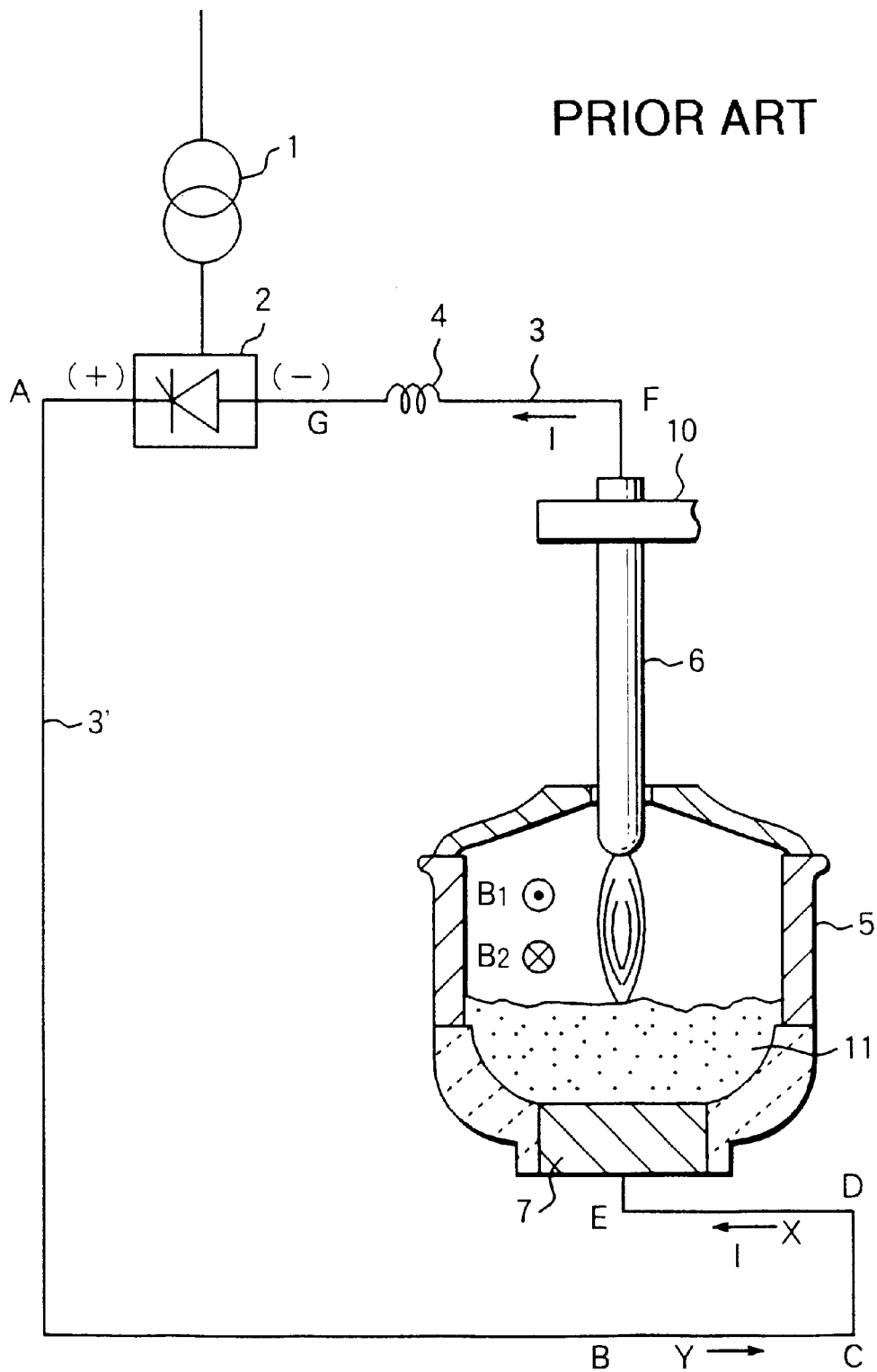
FIG. 24 is a schematic diagram illustrative of a prior art.

FIG. 1 shows the configuration of a first embodiment. In the drawing, the same reference numerals as those used in FIG. 24 denote the same or corresponding parts. In this embodiment, an auxiliary coil means in the form of an auxiliary coil 8 is mounted on the side wall of an arc furnace in the form of a DC arc furnace 5 in order to produce a magnetic field B2 in a direction opposite a magnetic field B1 which is produced at an arc generating point of a movable electrode 6 by a feeder circuit means which includes a power supply means in the form of a power supply such as a furnace transformer 1 and a feeder conductor means in the form of a feeding conductor 3.

The auxiliary coil 8 is formed by bending a conductor similar to the feeding conductor 6 or a portion of the feeding conductor 6 extended from the positive electrode (+) of the thyristor converter 2 to a furnace bottom electrode 7 so that it is parallel to the surface formed by the feeder circuit and assumes the shape of an inverted "U" (E-F-G-H) in the lengthwise direction of the DC arc furnace 5. The feeding conductor 3 is used as the generic term for the conductor 3 for providing the connection between the movable electrode 6 and the smoothing reactor 4, between the smoothing reactor 4 and the thyristor converter 2, and between the thyristor converter 2 and the auxiliary coil 8; therefore, the feeding conductor 3 shall be construed as a conductor, i.e. the feeding conductor, in the embodiments set forth below.

When a DC voltage supplied from the transformer 1 through a feeding device in the form of a thyristor converter 2 is applied between the movable electrode 6 and the furnace bottom electrode 7 via the feeding conductor 3, a DC arc is generated in the DC arc furnace 5. At this time, DC current I flowing through the feeding conductor 3 causes magnetic field B1 to be generated in the DC arc furnace 5 and also magnetic field B2 to be generated in the auxiliary coil 8. The auxiliary coil 8 is installed in the feeder circuit to generate magnetic field B2 which is in the opposite direction from magnetic field B1. As a result, magnetic fields B1 and B2 cancel each other, thus preventing magnetic field B1 from influencing the DC arc from the movable electrode 6.

Figure 2:
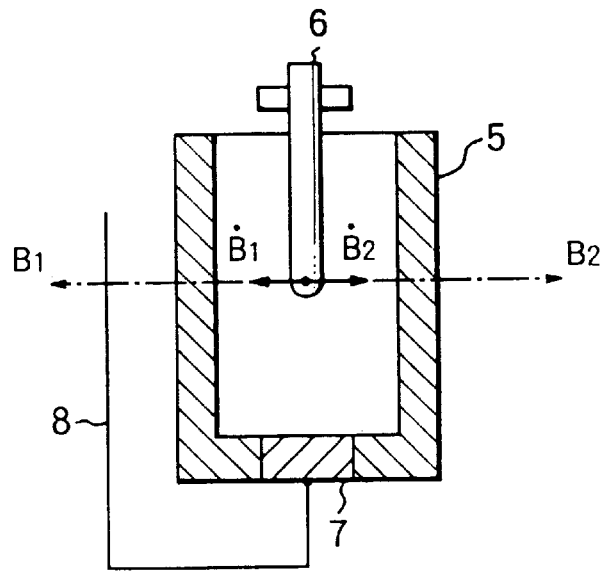
FIG. 2 is a vector diagram showing a magnetic field for illustrating the operation of the first embodiment.

FIG. 2 shows the vectors of magnetic field B1 influencing the DC arc from the movable electrode 6 and magnetic field B2 generated by the auxiliary coil 8. In the drawing, magnetic fields B1 and B2 produced by the feeding conductor 3 and the auxiliary coil 8 provide vectors which are equivalent in value and opposite in direction. For this reason, magnetic fields B1 and B2 cancel each other and the DC arc produced at the arc generating point of the movable electrode 6 is not influenced by magnetic field B1, making it possible to lead the DC arc discharge direction vertically downward.

Second Embodiment

Figure 3:
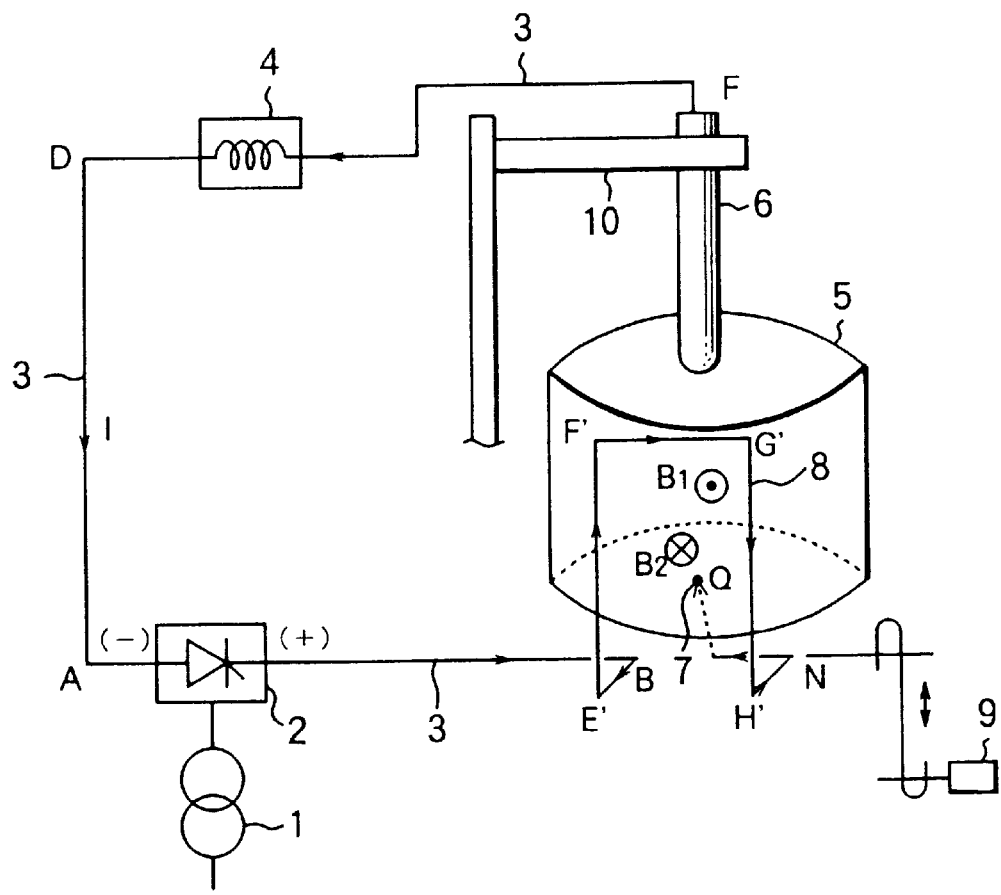
FIG. 3 is a schematic diagram illustrative of a second embodiment of the arc control apparatus in accordance with the invention.

Whereas the auxiliary coil 8 in a first embodiment is fixed in the predetermined position, the auxiliary coil 8 in the second embodiment moves up and down as the movable electrode 6 moves up and down. FIG. 3 shows the configuration of the arc control apparatus according to the second embodiment. In the drawing, the same reference numerals as those of FIG. 1 denote the same or corresponding parts. The auxiliary coil 8 is mounted on the side wall of the DC arc furnace 5 so as to produce the magnetic field in the opposite direction from the magnetic field which is produced at the arc generating point of the movable electrode 6 by the feeding conductor. The auxiliary coil 8 is moved up and down along the DC arc furnace by an auxiliary coil moving device 9.

Moving the auxiliary coil 8 by the auxiliary coil moving device 9 as the movable electrode 6 moves up and down allows magnetic field B2 generated by the auxiliary coil 8 to follow the arc generating point.

In this exemplary embodiment, the auxiliary coil 8 is installed so that magnetic field B2 is generated in the opposite direction from that of magnetic field B1 generated by the feeding conductor 3. Hence, even when the position of the arc generating point is shifted as the movable electrode 6 moves, the magnitude of magnetic field B1' produced by the feeding conductor 3 and the magnitude of magnetic field B2 generated by the auxiliary coil 8 in that position are equal and opposite in direction. Thus magnetic fields B1' and B2 cancel each other and the DC arc from the movable electrode 6 is not influenced by magnetic field B1'.

Figure 4:
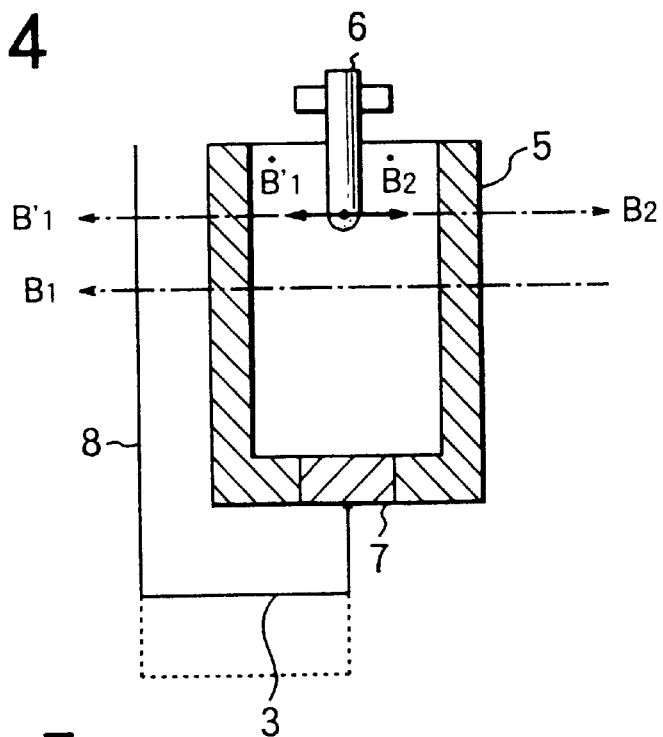
FIG. 4 is a vector diagram showing a magnetic field for illustrating the operation of the second embodiment.

FIG. 4 shows the vectors of magnetic field B1', which influences the DC arc from the movable electrode 6, and magnetic field B2 generated by the auxiliary coil 8. In the drawing, magnetic fields B1' and B2, which are produced by the feeding conductor 3 and the auxiliary coil 8, respectively, as the movable electrode 6 moves up or down, provide vectors which are equivalent in value and opposite in direction.

For this reason, combining the vectors of magnetic fields B1' and B2 causes them to cancel each other and the magnetic fields can be controlled so that they do not affect the DC arc given through the movable electrode 6. Thus, according to the configuration of the second embodiment, even when the vertical shift of the movable electrode 6 causes a significant change in the arc generating position, the DC arc discharge direction can be led vertically downward and the direction in which the DC arc is generated can be fully controlled within a certain range; therefore, the object 11 to be melted in the furnace can be quickly and efficiently melted by evenly discharging the DC arc.

Third Embodiment

The auxiliary coil 8 in the first embodiment is formed by leading a part of the feeding conductor 3 in one horizontal direction of the feeder circuit. In the third embodiment, another auxiliary coil 8' is connected to the existing auxiliary coil 8 via the feeder circuit in parallel facing the existing auxiliary coil 8 via the DC arc furnace 5. More specifically, according to the mode of the third embodiment, the auxiliary coil 8 is installed on the side wall of the DC arc furnace 5 so as to generate the magnetic field in the opposite direction from the magnetic field generated at the arc generating point of the movable electrode 6 by the feeding conductor 3 and another auxiliary coil 8' is disposed facing the auxiliary coil 8 with the DC arc furnace 5 between them. The magnetic field generated in the additional auxiliary coil 8' is in the same direction as that of the magnetic field produced at the arc generating point of the movable electrode 6 by the feeding conductor 3.

Figure 5:
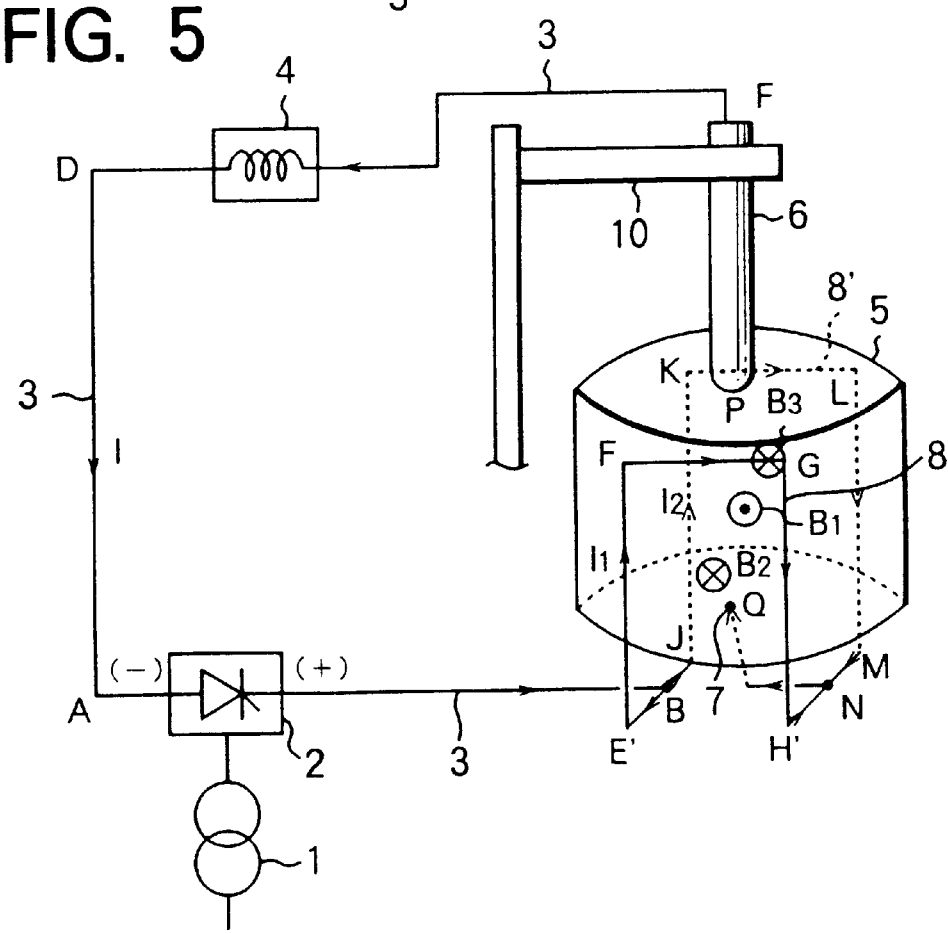
FIG. 5 is a schematic diagram illustrative of a third embodiment of the arc control apparatus in accordance with the invention.

FIG. 5 shows the configuration of the third embodiment. The additional auxiliary coil 8' is disposed on the opposite side surface of the DC arc furnace 5 in relation to the auxiliary coil 8 formed on one side surface of the DC arc furnace 5 and it is connected in parallel to the auxiliary coil 8. The direction of the turns is selected so that magnetic field B3 generated by the auxiliary coil 8' is in the same direction of the magnetic field B2 generated by the auxiliary coil 8.

When a DC current I flows through the feeding conductor 3, magnetic field B1 is generated in the feeder circuit. At this time, DC current I is branched into the auxiliary coil 8 and the auxiliary coil 8' and DC currents I1 and I2, which have equal values, flow through the two coils. The auxiliary coils 8, 8' are installed so that magnetic fields B2 and B3 generated in the auxiliary coils 8 and 8', respectively, by currents I1 and I2 are half of magnetic field B1 and in the opposite direction from magnetic field B1.

Magnetic field B1 generated by the feeding conductor 3 has the same magnitude as, but the opposite direction from the resulting magnetic field from, B2 and B3 generated by the auxiliary coils 8, 8'. Accordingly, the vectors of magnetic field B1 and the combination of magnetic fields B2 and B3 cancel each other and the DC arc from the movable electrode 6 is not influenced.

Figure 6:
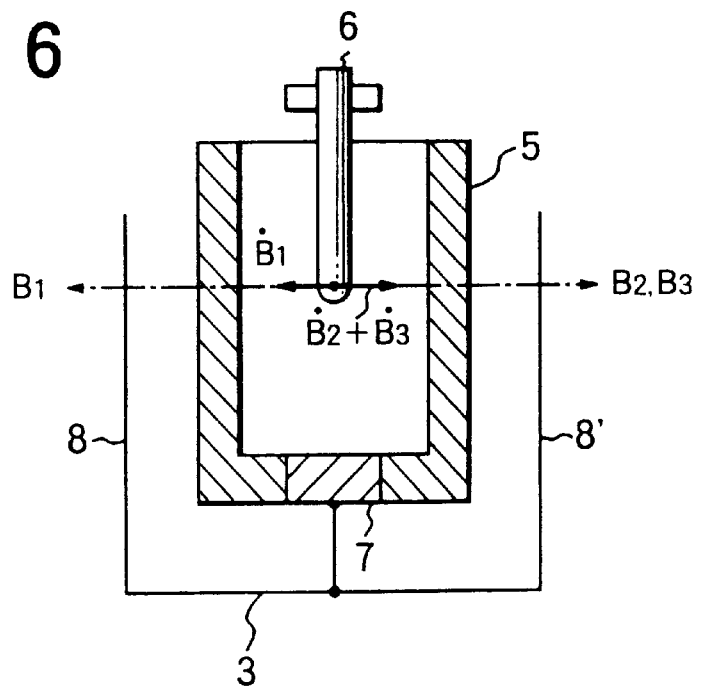
FIG. 6 is a vector diagram showing a magnetic field for illustrating the operation of the third embodiment.

FIG. 6 shows the vectors of magnetic field B1 which affects the DC arc from the movable electrode 6 and the vectors of the combined magnetic fields B2 and B3. In the drawing, magnetic field B1 and the combination of magnetic fields B2 and B3 generated by the feeding conductor 3 and the auxiliary coils 8, 8', respectively, provide the vectors which have an equal magnitude but opposite directions. As a result, combining the vectors of magnetic field B1 and the resulting magnetic field from B2 and B3 causes these magnetic fields to cancel each other, thus preventing them from interfering with the DC arc provided through the movable electrode 6.

Hence, according to the configuration of the third embodiment, the DC arc discharging direction at movable electrode arc generating point P can be led vertically downward, making it possible to fully cancel magnetic field B1 in a wider range than it would with a single auxiliary coil.

Fourth Embodiment

Whereas the auxiliary coils 8, 8' in the third embodiment are fixed in predetermined positions, the auxiliary coils 8, 8' in the fourth embodiment move up and down as the movable electrode 6 moves up and down.

Figure 7:
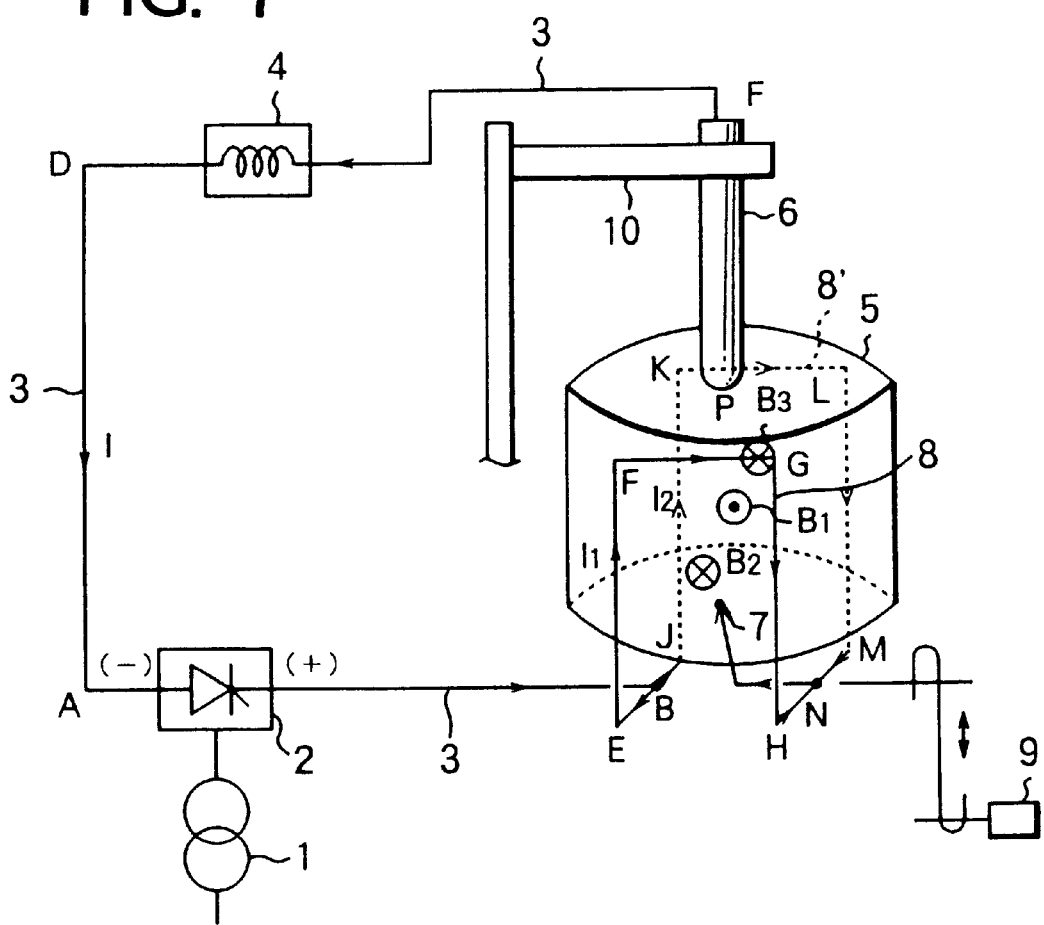
FIG. 7 is a schematic diagram illustrative of a fourth embodiment of the arc control apparatus in accordance with the invention.

FIG. 7 shows the configuration of the arc control apparatus according to the fourth embodiment. In the drawing, the same reference numerals as those utilized in FIG. 5 denote the same or corresponding parts. The auxiliary coils 8, 8' are moved up and down along the DC arc furnace 5 by an auxiliary coil moving device 9.

DC current I flowing through the feeding conductor 3 generates magnetic field B1. At this time, when magnetic field B1 moves up and down as the movable electrode 6 moves up and down, moving the auxiliary coils 8, 8' by the auxiliary coil moving device 9 allows the auxiliary coils 8, 8' to follow the DC arc trace.

In this embodiment, auxiliary coils are installed so that DC currents I1 and I2 are equal and magnetic fields B2 and B3 generated by DC currents I1 and I2 are half of magnetic field B1 and in the opposite direction from magnetic field B1. Hence, magnetic field B1 generated by the feeding conductor 3 and the resulting magnetic field from B2 and B3 generated by the auxiliary coils 8, 8' are equal in magnitude and opposite in direction. The combination of the vectors of magnetic field B1 and magnetic fields B2 and B3 causes these magnetic fields to cancel each other and therefore the DC arc from the movable electrode 6 is not influenced.

Figure 8:
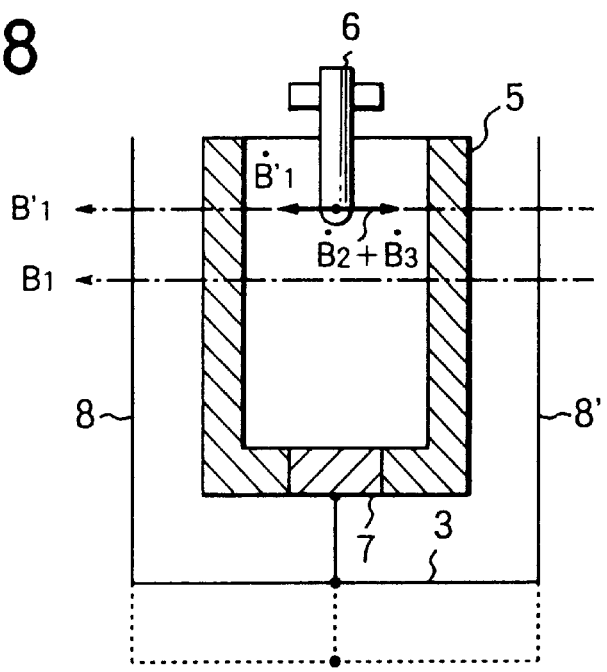
FIG. 8 is a vector diagram showing a magnetic field for illustrating the operation of the fourth embodiment.

FIG. 8 shows the vectors of magnetic field B1, which affects the DC arc from the movable electrode 6, and the vectors of the resulting magnetic field from B2 and B3 according to the fourth embodiment. In the drawing, magnetic field B1' and the combination of magnetic fields B2 and B3 generated by the feeding conductor 3 and the auxiliary coils 8, 8', respectively, when the movable electrode 6 moves up provide the vectors which have an equal magnitude but opposite directions. As a result, combining the vectors of magnetic field B1 and a magnetic field resulting from B2 and B3 causes these magnetic fields to cancel each other, thus preventing them from interfering with the DC are provided through the movable electrode 6.

Hence, according to the configuration of the fourth embodiment, even if the DC arc generating position is considerably shifted as the movable electrode moves up and down, the DC arc discharging direction can be led vertically downward and the object 11 in the furnace can be melted quickly and efficiently by uniformly discharging the DC arc toward the object 11 to be melted.

Fifth Embodiment

In the third embodiment, the auxiliary coils 8 and 8' are installed so that they are parallel to the direction of magnetic field B1; in the fifth embodiment, the two auxiliary coils 8, 8' are installed relative to the bottom of the furnace at a certain angle so that they are parallel to the feeder circuit, with the movable electrode between them. The two auxiliary coils 8, 8' produce magnetic fields toward the movable electrode arc generating point located above at a predetermined angle. The produced magnetic field fully cancels the magnetic field which is generated at the movable electrode arc generating point by the feeding conductor, thereby directing the arc from the movable electrode vertically downward.

Figure 9:
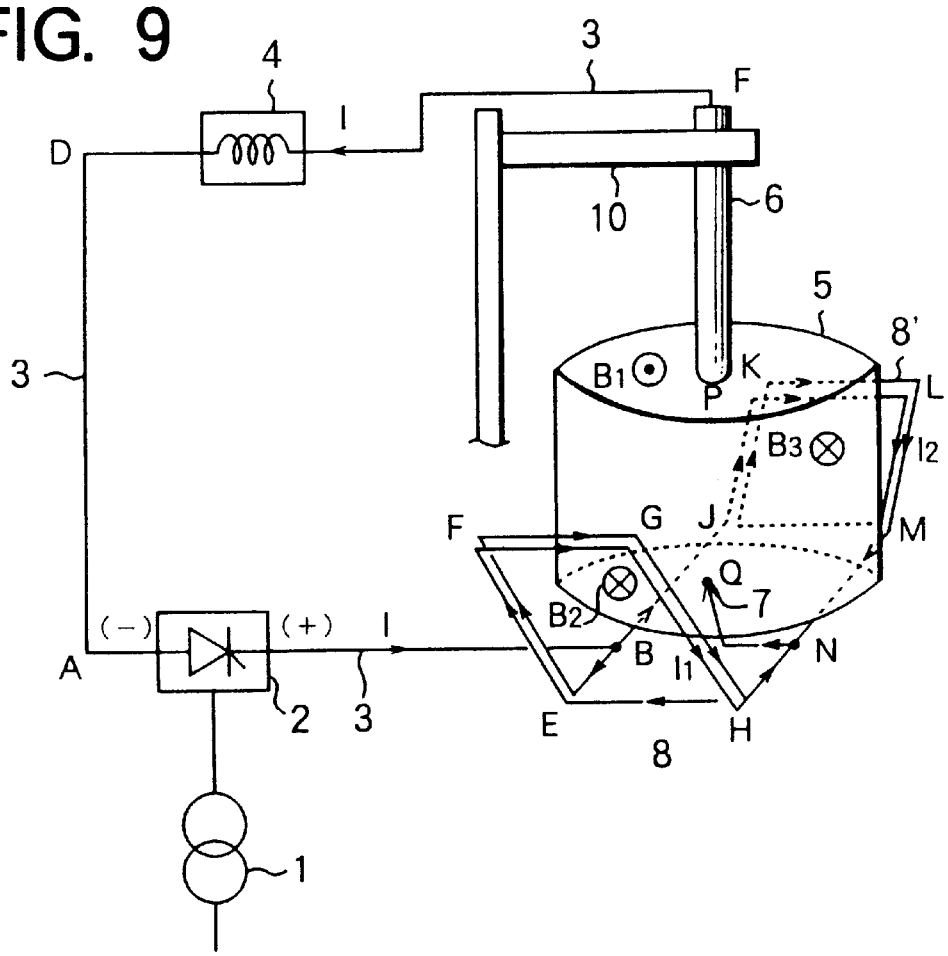
FIG. 9 is a schematic diagram illustrative of a fifth embodiment of the arc control apparatus in accordance with the invention.

FIG. 9 shows the configuration of the arc control apparatus according to the fifth embodiment. According to the design of this embodiment, as illustrated in FIG. 9, the auxiliary coils 8 and 8' are installed at a predetermined angle θ with respect to the direction of magnetic field B1. The number of turns of the auxiliary coils 8, 8' are set so that DC currents I1 and I2 branched into the auxiliary coils are equal and magnetic fields B2 and B3 generated by DC currents I1 and I2, respectively, equal 1/(2cosθ) of magnetic field B1.

Figure 10:
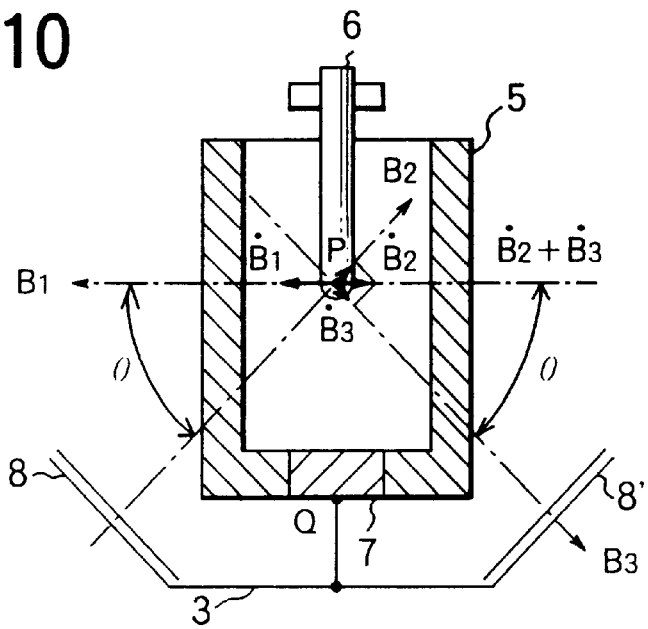
FIG. 10 is a vector diagram showing a magnetic field for illustrating the operation of the fifth embodiment.

FIG. 10 shows the resulting vectors of magnetic field B1, which effects the DC arc discharged through the movable electrode 6, and magnetic fields B2 and B3 generated by the auxiliary coils 8 and 8' which are installed at angle θ in relation to the direction of magnetic field B1 in the configuration of the fifth embodiment.

In the drawing, magnetic field B2 is produced at angle θ from the central axis toward movable electrode arc generating point P which is perpendicular to the plane of the auxiliary coil 8 and magnetic field B3 is produced at angle θ from point P toward the central axis which is perpendicular to the plane of the auxiliary coil 8'. Accordingly, the resulting vector of magnetic fields B2 and B3 is directed in the opposite direction by 180 degrees from that of magnetic field B1 so as to cause them to cancel, thus making it possible to discharge the arc vertically downward.

According to the configuration of the fifth embodiment, the auxiliary coils 8 and 8' are installed on the bottom of the furnace at angle θ in relation to movable electrode arc generating point P from the central axis perpendicular to the planes of the auxiliary coils 8 and 8'. Therefore, the DC arc discharge can be directed vertically downward as in the case of the third embodiment and the space for installing the auxiliary coils on the furnace side surface can be reduced, permitting easier work in front of the furnace such as in taking out ores.

Sixth Embodiment

Figure 11:
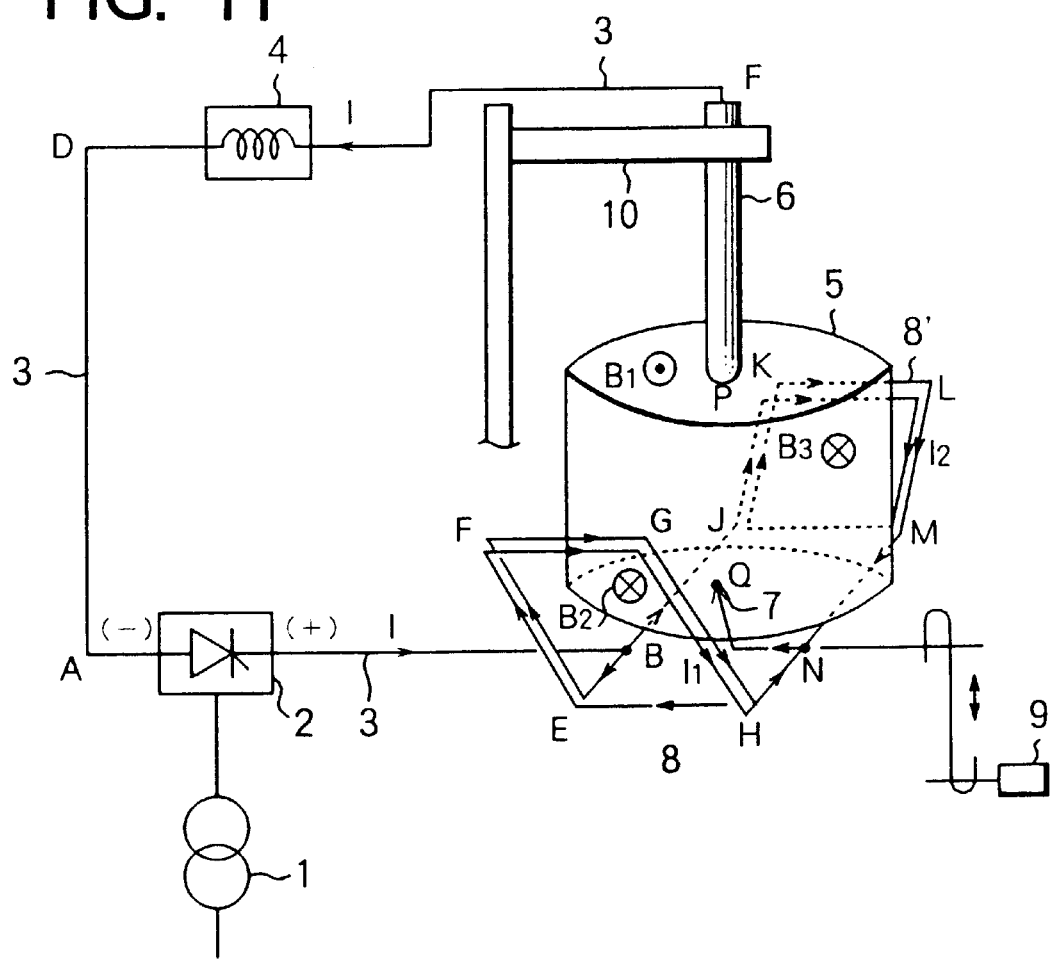
FIG. 11 is a schematic diagram illustrative of a sixth embodiment of the arc control apparatus in accordance with the invention.

Whereas the auxiliary coils 8, 8' in the fifth embodiment are fixed in the predetermined positions, the auxiliary coils 8, 8' in the sixth embodiment move up and down as the movable electrode 6 moves up and down. FIG. 11 shows the configuration of the arc control apparatus according to the sixth embodiment. In the drawing, the same reference numerals as those of FIG. 9 denote the same or corresponding parts. The auxiliary coils 8, 8' are moved up and down along the DC arc furnace 5 by the auxiliary coil moving device 9.

Figure 12:
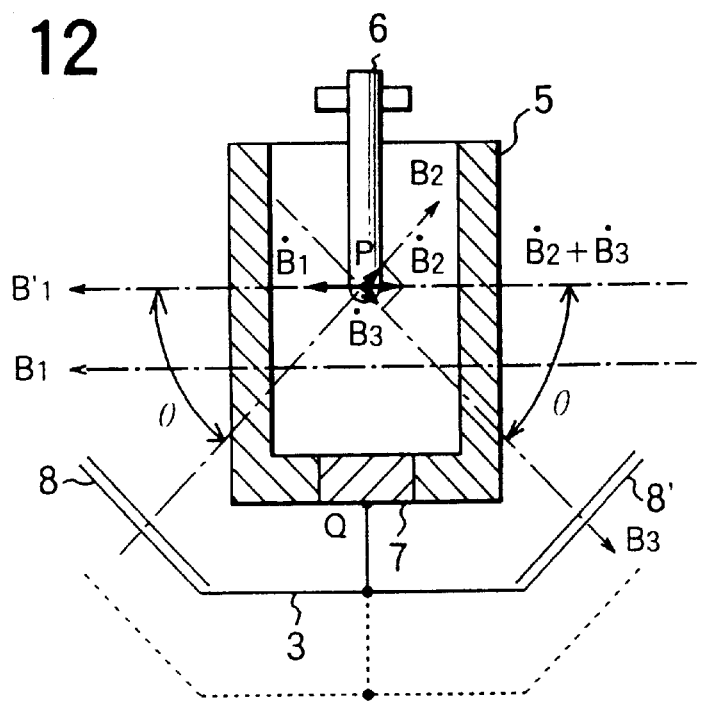
FIG. 12 is a vector diagram showing a magnetic field for illustrating the operation of the sixth embodiment.

FIG. 12 shows the vectors of magnetic field B1, which influences the DC arc discharged from the movable electrode 6, and magnetic fields B2 and B3 which are produced at angle θ with respect to the central axis which is perpendicular to movable electrode arc generating point P and the planes of the auxiliary coils 8, 8' in the configuration of the sixth embodiment.

In the drawing, magnetic field B2 is produced at angle θ toward the movable electrode arc generating point P from the central axis perpendicular to the plane of the auxiliary coil 8 by moving the auxiliary coils 8 and 8' by the auxiliary coil moving device 9 in accordance with the vertical movement of the movable electrode. Magnetic field 33 is produced at angle θ from point P to the central axis perpendicular to the plane of the auxiliary coil 8'. The resulting vector of magnetic fields B2 and B3 are directed in the opposite direction by 180 degrees from that of magnetic field B1' so as to cause them to cancel, thus making it possible to discharge the arc vertically downward.

According to the configuration of the sixth embodiment, even if the DC arc generating position is considerably shifted as the movable electrode moves up and down, the DC arc discharge can be directed vertically downward and the object 11 in the furnace can be melted quickly and efficiently by uniformly discharging the DC arc toward the object 11 to be melted.

Seventh Embodiment

Figure 13:
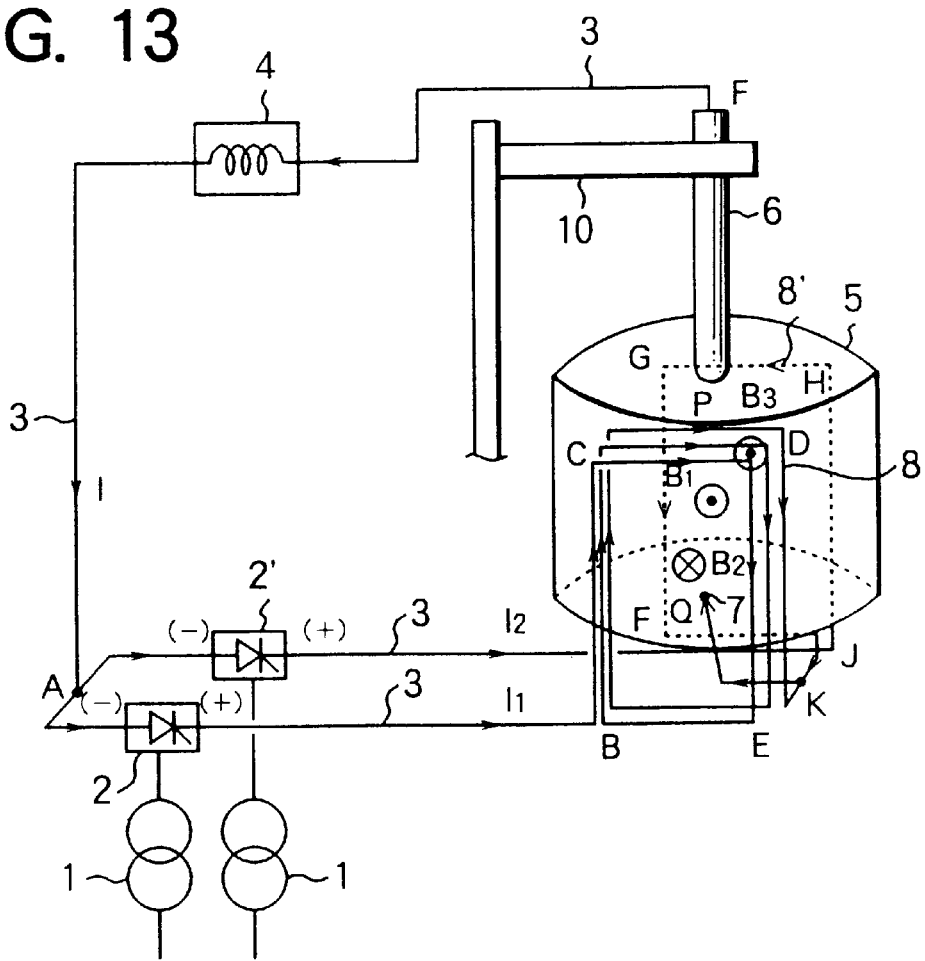
FIG. 13 is a schematic diagram illustrative of a seventh embodiment of the arc control apparatus in accordance with the invention.

In the third embodiment (see FIG. 5), the auxiliary coils 8, 8' which have the same number of turns are connected in parallel with the feeder circuit between them and DC current I from the single feeding device is branched into the auxiliary coils 8, 8'. In the seventh embodiment, as illustrated in FIG. 13, the number of turns of the auxiliary coil 8, i.e. the first auxiliary coil, is three times the number of turns of the auxiliary coil 8', i.e. the second auxiliary coil, and the turning direction of the auxiliary coil 8' is in the opposite from that of the auxiliary coil 8 as illustrated. More specifically, the auxiliary coil 8 for generating the magnetic field through the feeder circuit is provided on the side wall of the DC arc furnace 5 in order to generate the magnetic field in the opposite direction from the magnetic field produced at the arc generating point of the movable electrode 6 by the feeding conductor and the auxiliary coil 8' is installed parallel to the feeder circuit with the movable electrode between itself and the auxiliary coil 8 in such a manner that the direction of turns thereof is in the opposite from that of the auxiliary coil 8 and the number of turns thereof is three times that of the auxiliary coil 8.

Further, the ends on one side of the auxiliary coils 8, 8' are commonly connected to the furnace bottom electrode 7; DC currents I1, I2 are separately supplied from the feeding device, i.e. the thyristor converter 2 which comprises the first feeder circuit, and the feeding device, i.e. a thyristor converter 2' which comprises the second feeder circuit, the feeding devices being provided on the ends on the other side of the auxiliary coils 8, 8'. The rest of the structure is identical to the structure of the third embodiment.

DC current I flowing through the feeding conductor 3 produces magnetic field B1. In this embodiment, magnetic field B2 generated in the auxiliary coil 8 by DC current I1 is about 3/2 of the magnetic field B1 and it is in the opposite direction the magnetic field B1. Furthermore, the auxiliary coils are installed so that magnetic field B3 generated in the auxiliary coil 8' by DC current I2 is about half of magnetic field B1 and it is in the same direction as magnetic field B1. Hence, the resulting magnetic field from magnetic field B1 generated by the feeding conductor 3 and magnetic field B3 generated by the auxiliary coil 8' are equal in magnitude to but opposite in direction from magnetic field B2 generated by the other auxiliary coil 8. Magnetic field B2 and the resulting magnetic field from magnetic fields B1 and B3 cancel each other, exerting no influence on the DC arc given from the movable electrode 6. Moreover, the magnitude of the resulting magnetic field from B1 and B3 can be changed by changing the magnitude of DC currents I1 and I2 through the feeding devices 2, 2'.

Figure 14:
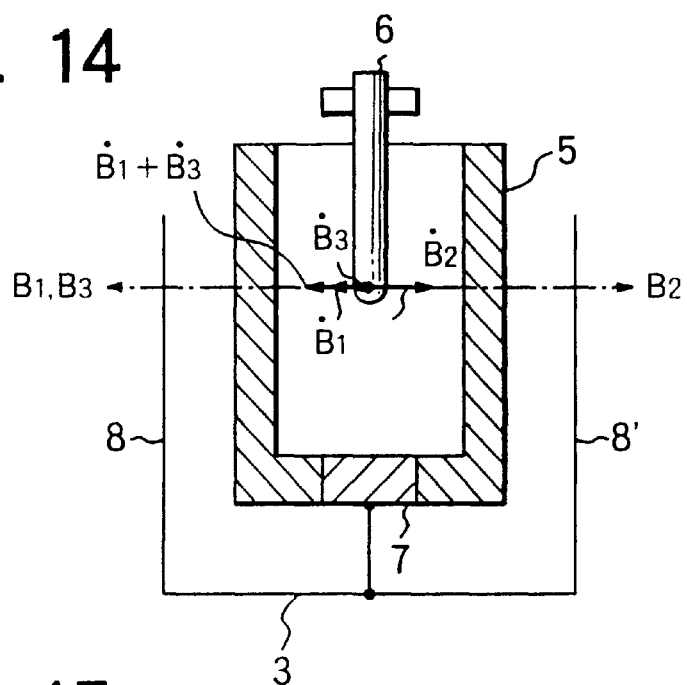
FIG. 14 is a vector diagram showing a magnetic field for illustrating the operation of the seventh embodiment.

FIG. 14 shows the vectors of B2 and the resulting magnetic fields from B1 and B3 effecting the DC arc from the movable electrode 6 according to the seventh embodiment. In the drawing, the resulting magnetic fields B1 and B3 and magnetic field B2 which are generated by the feeding conductor 3 and the auxiliary coils 8, 8' provide the vectors which have equal values and opposite directions. Hence, the resulting magnetic fields from B1 and B3 and magnetic field B2 cancel each other and do not influence the DC arc from the movable electrode, thus allowing the DC arc to be directed vertically downward.

In addition, the direction and magnitude of the resulting magnetic field combined with the magnetic field B1 can be controlled by changing the magnitude of DC currents I1, I2 through the feeding device and by changing the magnitude of magnetic fields B2 and B3 generated by the auxiliary coils 8, 8'.

According to the seventh embodiment, the DC arc discharge at the arc generating point P of the movable electrode 6 can be led vertically downward and also orthogonally to and in both directions of magnetic field B1. This enables uniform discharge of the DC arc to the object 11 to be melted in the furnace, permitting quick, efficient melting.

Eighth Embodiment

Figure 15:
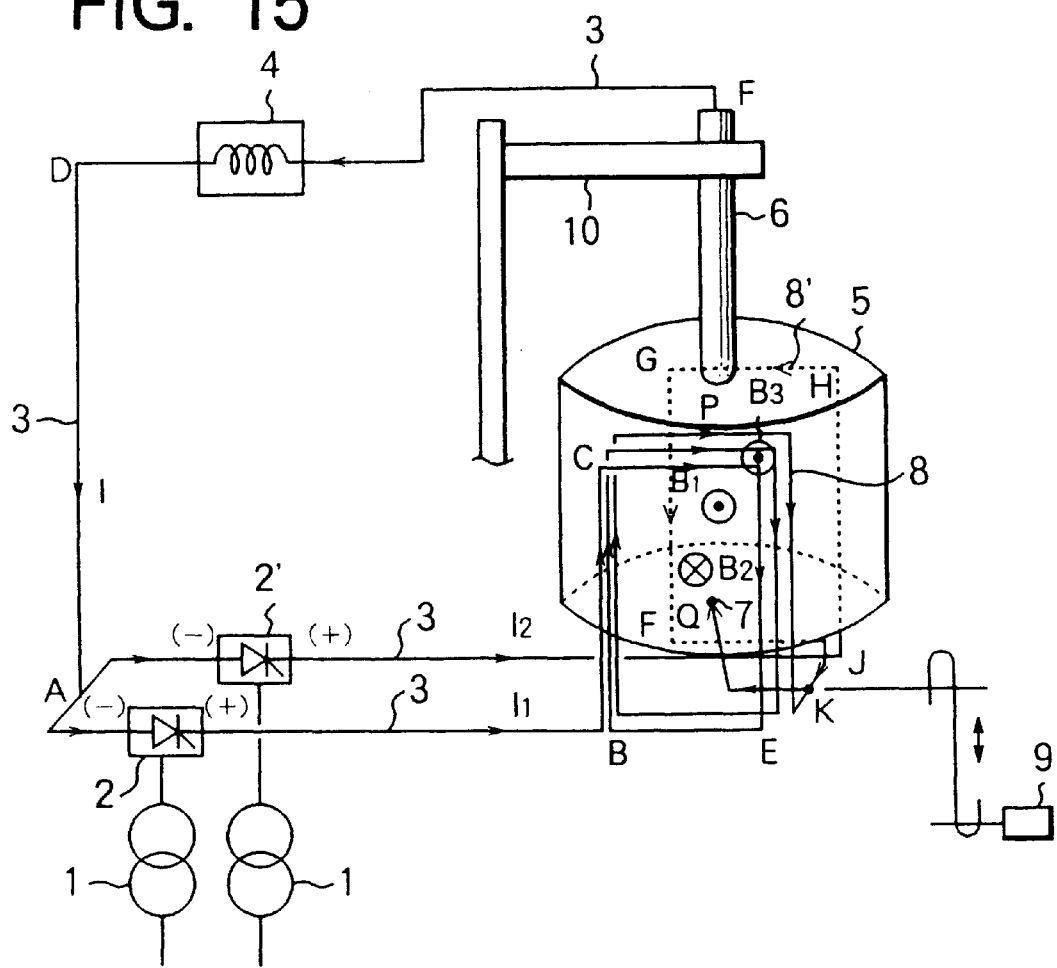
FIG. 15 is a schematic diagram illustrative of an eighth embodiment of the arc control apparatus in accordance with the invention.

Whereas the auxiliary coils 8, 8' in the seventh embodiment are fixed in the predetermined positions, the auxiliary coils 8, 8' in the eighth embodiment move up and down as the movable electrode 6 moves up and down. FIG. 15 shows the configuration of the arc control apparatus according to the eighth embodiment. In the drawing, the same reference numerals as those of FIG. 13 denote the same or corresponding parts. The auxiliary coils 8, 8' are moved up and down along the DC arc furnace 5 by the auxiliary coil moving device 9. The rest of the construction is the same as the construction of the seventh embodiment.

The DC arc furnace according to the eighth embodiment is designed to generate the DC arc in the furnace by applying a DC voltage from the feeding device to the movable electrode 6. DC current I flowing through the feeding conductor 3 generates magnetic field B1. At this time, if magnetic field B1 moves up and down as the movable electrode 6 moves up and down, then the DC arc can be traced by moving the auxiliary coils 8, 8'.

In this embodiment, magnetic field B2 generated in the auxiliary coil 8 by DC current I1 is about 3/2 of magnetic field B1 and it is in the opposite direction from magnetic field B1. Furthermore, the auxiliary coils are installed so that magnetic field B3 generated by DC current I2 is about half of magnetic field B1 and it is in the same direction as magnetic field B1. Hence, the resulting magnetic field from magnetic field B1 generated by the feeding conductor 3 and magnetic field B3 generated by the auxiliary coil 8' are equal in magnitude to but opposite in direction from magnetic field B2 generated by the other auxiliary coil 8. Magnetic field B2 and the resulting magnetic field from magnetic fields B1 and B3 cancel each other, exerting no influence on the DC arc given from the movable electrode. Moreover, the magnitude of the resulting magnetic field from B1 and B3 can be changed by changing the magnitude of DC currents I1 and I2 through the feeding devices 2, 2'.

Figure 16:
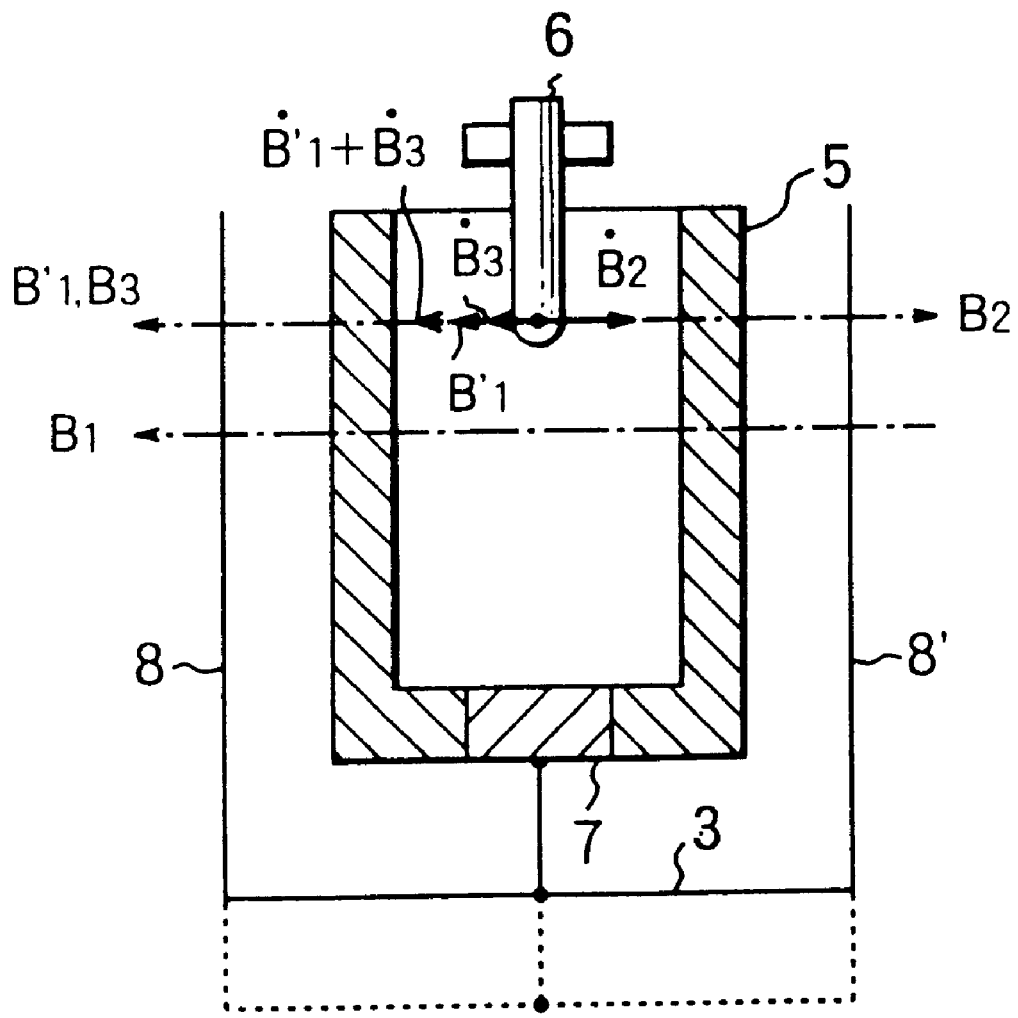
FIG. 16 is a vector diagram showing a magnetic field for illustrating the operation of the eighth embodiment.

FIG. 16 shows the vectors of magnetic field B1 affecting the DC arc from the movable electrode 6 and of magnetic fields B2 and B3 according to the eighth embodiment. Combining magnetic field B1' and magnetic fields B3 and B2 generated by the feeding conductor 3 and the auxiliary coils 8, 8' when the movable electrode 6 moves up provides the vectors which have equal values and opposite directions. Hence, the resulting magnetic fields from B1' and B3 and magnetic field B2 cancel each other and do not influence the DC arc from the movable electrode 6.

In addition, the magnitude of magnetic fields B2 and B3 generated by the auxiliary coils 8, 8' can be changed by controlling DC currents I1, I2 through the feeding device, thus making it possible to change the resulting magnetic field combined with magnetic field B1.

According to the eighth embodiment, the DC arc discharge can be led vertically downward and also orthogonally to and in both directions of magnetic field B1 even if the DC arc generating position is shifted by the vertical movement of the movable electrode 6. This enables uniform discharge of the DC arc to the object 11 to be melted in the furnace, permitting quick, efficient melting.

Although in the aforementioned first through seventh embodiments, one or two auxiliary coil(s) 8 with one or two feeder circuit(s) are employed, any number of auxiliary coils with a corresponding number of feeder circuits disposed outside and in the vicinity of the arc furnace 5 and connected to the feeder circuits, respectively, can be used for generating a counter magnetic field in a direction to cancel a magnetic field which is generated at the arc generating point of the movable electrode 6 by means of the feeder circuits.

Ninth Embodiment

Figure 17:
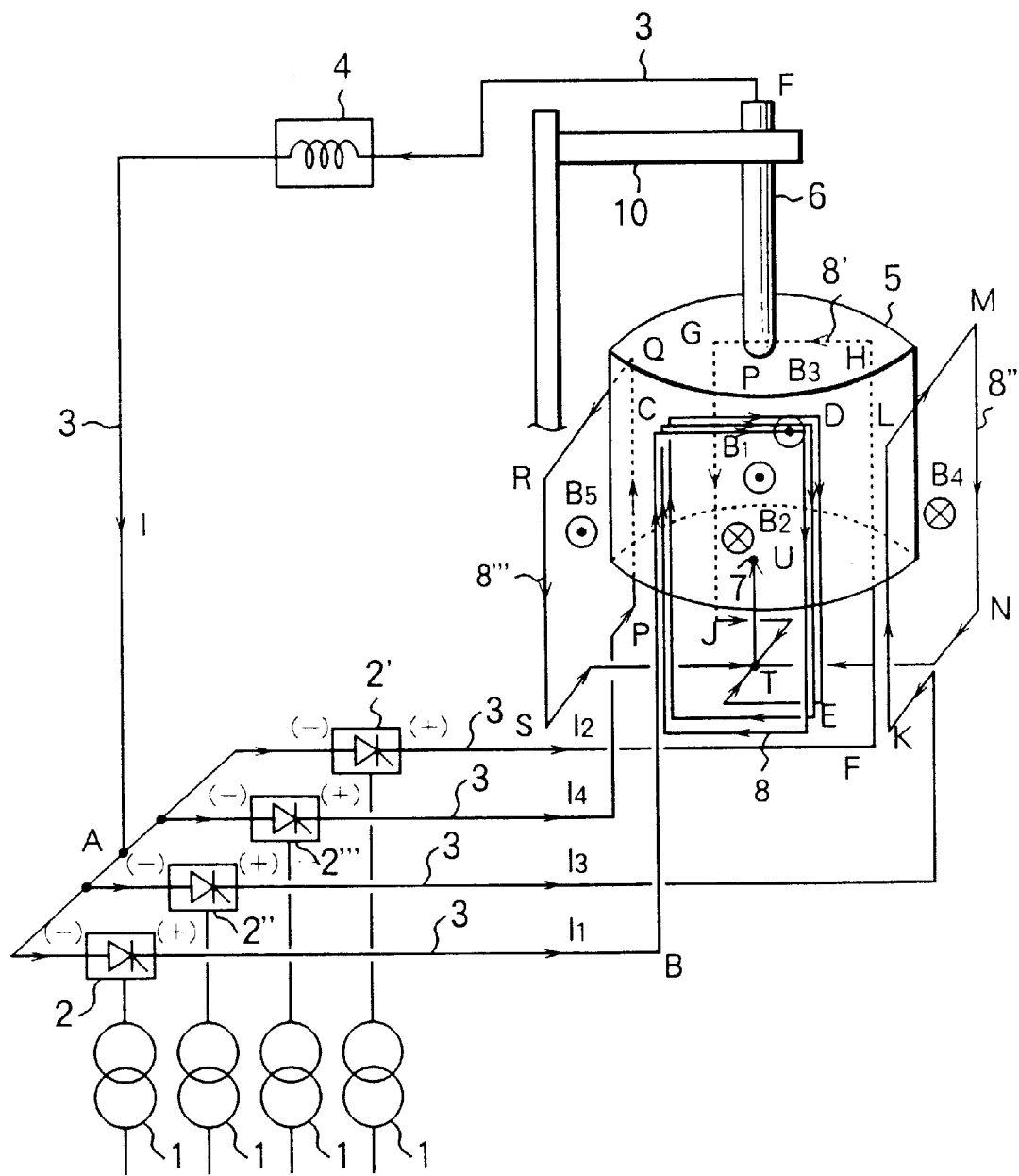
FIG. 17 is a schematic diagram illustrative of a ninth embodiment of the arc control apparatus in accordance with the invention.

In the seventh embodiment, the auxiliary coils 8, 8' are disposed facing each other parallel to the feeder circuits around the movable electrode 6; in the ninth embodiment, an auxiliary coil 8", i.e. the third auxiliary coil, and an auxiliary coil 8''', i.e. the fourth auxiliary coil, are disposed facing each other around the movable electrode 6 in addition to the auxiliary coils 8, 8' as illustrated in FIG. 17. Hence, the four auxiliary coils 8, 8', 8", and 8''' are disposed around the DC arc furnace 5 at intervals of 90 degrees. The ends on one side of the auxiliary coils 8, 8', 8", and 8'" are commonly connected to the furnace bottom electrode 7; the ends on the other side of the auxiliary coils 8, 8", 8', and 8'" are connected to the positive (+) side of thyristor converters 2, 2", 2'", and 2'.

DC current I1 is supplied from the thyristor converter 2 to the auxiliary coil 8; DC current I3 is supplied from the thyristor converter 2", which comprises the third feeder circuit, to the auxiliary coil 8"; DC current I2 is supplied from the thyristor converter 2' to the auxiliary coil 8'; and DC current I4 is supplied from the thyristor converter 2'", which comprises the fourth feeder circuit, to the auxiliary coil 8'". The number of turns of the auxiliary coil 8 is three times that of the auxiliary coil 8", 8', or 8'".

The direction of magnetic field B2 generated is opposite that of magnetic field B1 generated by the feeder circuit; the direction of magnetic field B4 generated by the auxiliary coil 8" which is located at 90 degrees to the right from the auxiliary coil 8 is perpendicular to the magnetic field B2; the direction of magnetic field B3 generated by the auxiliary coil 8' located at 90 degrees to the right of the auxiliary coil 8" is identical to that of the magnetic field B1; and the direction of magnetic field B5 generated by the auxiliary coil 8'" located at 90 degrees to the right of the auxiliary coil 8' is opposite that of magnetic field B4.

DC current I flowing through the feeding conductor 3 generates magnetic field B1 in the feeder circuit. As in the case of the seventh embodiment, the magnitudes of magnetic fields B2 and B3 generated by the auxiliary coils 8 and 8' can be controlled by controlling DC currents I1 and I2 by virtue of the thyristor converters 2, 2'; the magnitudes of magnetic fields B4 and B5 generated by the auxiliary coils 8" and 8'" can be controlled by controlling DC currents I3 and I4 by virtue of the thyristor converters 2", 2'".

Figure 18:
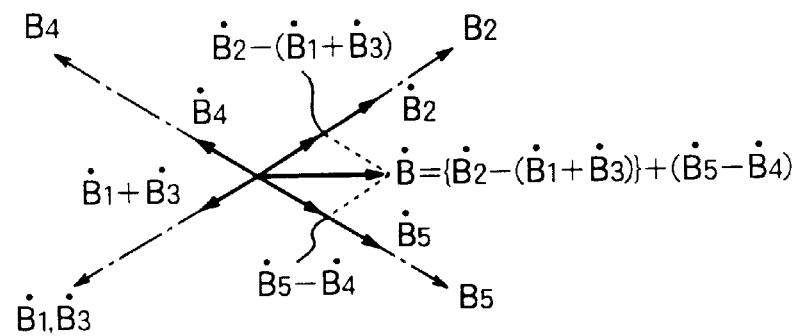
FIG. 18 is a perspective view of the vectors of a magnetic field for illustrating the operation of the ninth embodiment.

FIG. 18 is the perspective view of the vectors of magnetic field B1 influencing the DC arc from the movable electrode and magnetic fields B2, B3, B4, and B5 according to the ninth embodiment. Total resulting vector B (={B2−(B1+B3)}+B5−B4) from the combination of magnetic fields B1 plus B3 and B2 and the combination of B4 and B5 can be generated in any direction by changing the magnitude of DC currents I1, I2, I3, and I4. In the case shown in the drawing, if B1+B3<B2 and B4<B5, then resulting vector B influencing the DC arc can be generated in the direction illustrated.

According to the construction of the ninth embodiment, the DC arc discharge at movable electrode arc generating point P can be led vertically downward and in any direction. Further, the DC arc discharging direction can be shifted to uniformly melt the object 11 to be melted in the furnace by changing DC currents I1, I2, I3, and I4 in sequence.

Tenth Embodiment

Figure 19:
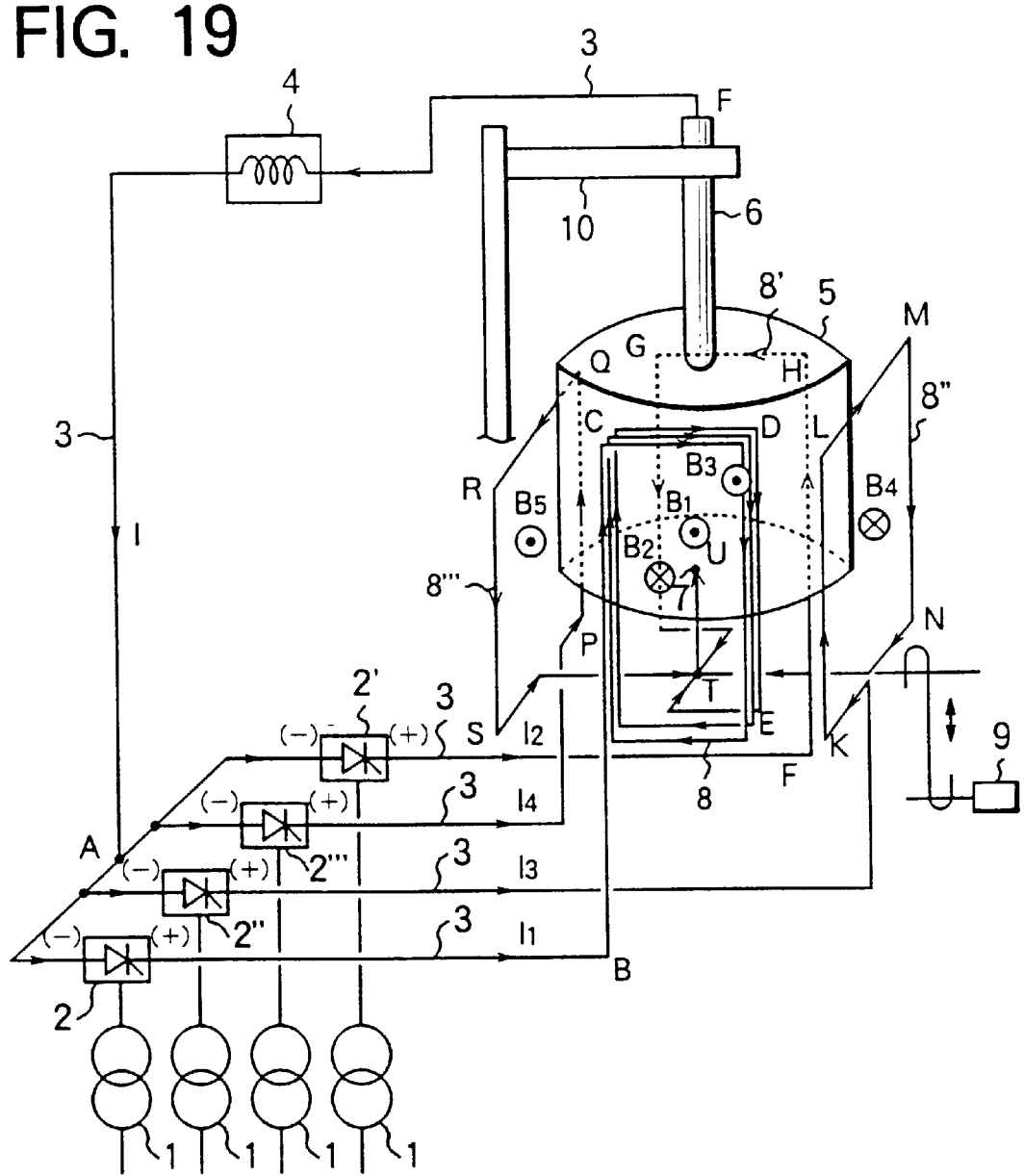
FIG. 19 is a schematic diagram illustrative of a tenth embodiment of the arc control apparatus in accordance with the invention.

Whereas the auxiliary coils 8, 8", 8', and 8'" in the ninth embodiment are fixed in the predetermined positions, the auxiliary coils 8, 8", 8', and 8'" in the tenth embodiment move up and down as the movable electrode 6 moves up and down. FIG. 19 shows the configuration of the arc control apparatus according to the tenth embodiment. In the drawing, the same reference numerals as those of FIG. 17 denote the same or corresponding parts. The auxiliary coils 8, 8'", 8', and 8'" are moved up and down along the DC arc furnace by the auxiliary coil moving device 9.

DC current I flowing through the feeding conductor 3 generates magnetic field B1 in the auxiliary coil 8. At this time, the DC arc can be traced by moving the auxiliary coil 8 up or down when magnetic field B1 moves up or down according to the vertical movement of the movable electrode 6. As in the case of the seventh embodiment, the magnitude of magnetic fields B2 and B3 generated in the auxiliary coils 8 and 8' can be controlled by controlling DC currents I1 and I2 by virtue of the thyristor converters 2, 2'; the magnitude of magnetic fields B4 and B5 generated in the auxiliary coils 8" and 8'" can be controlled by controlling DC currents I3 and I4 by virtue of the thyristor converters 2", 2'".

Figure 20:
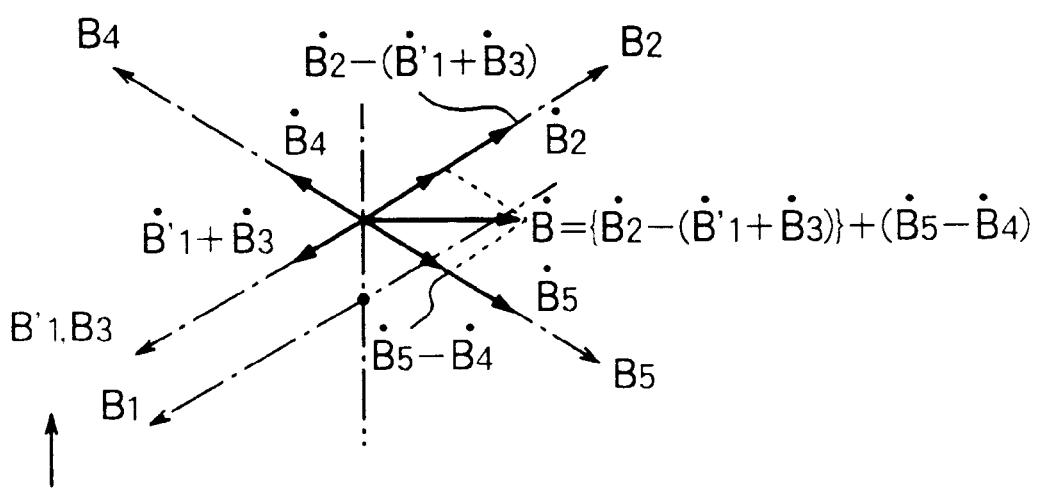
FIG. 20 is a perspective view of the vectors of a magnetic field for illustrating the operation of the tenth embodiment.

FIG. 20 is the perspective view of the vectors of magnetic field B1 influencing the DC arc from the movable electrode 6 and magnetic fields B2, B3, B4, and B5 according to the tenth embodiment. Total resulting vector B from the combination of magnetic fields B1 plus B3 and B2 and the combination of B4 and B5 can be generated in any direction by moving up or down the auxiliary coils 8, 8', 8", and 8'" to change the magnitude of DC currents I1, I2, I3, and I4 when the movable electrode 6 moves up or down. In the case shown in the drawing, if the magnetic field generated by the feeding conductor 3 when the movable electrode 6 moves up is B1'+B3<B2 and B4<B5, then resulting vector B influencing the DC arc can be generated in the direction illustrated.

Hence, according to the construction of the tenth embodiment, the DC arc discharge can be led vertically downward and in any direction even when the DC arc generating position is shifted by the vertical movement of the movable electrode 6. Further, the DC arc discharging direction can be shifted to uniformly melt the object 11 to be melted in the furnace by changing DC currents I1, I2, I3, and I4 in sequence.

Although in the above-described ninth and tenth embodiments, four auxiliary coils with four branched feeder circuits are preferably employed, any number of auxiliary coils with a corresponding number of branched feeder circuits can be used which are disposed outside and in the vicinity of the arc furnace 5 and connected to the branched feeder circuits, respectively, for generating, together with a magnetic field generated by the feeding conductor, a magnetic field in a desired direction.

Eleventh Embodiment

Figure 21:
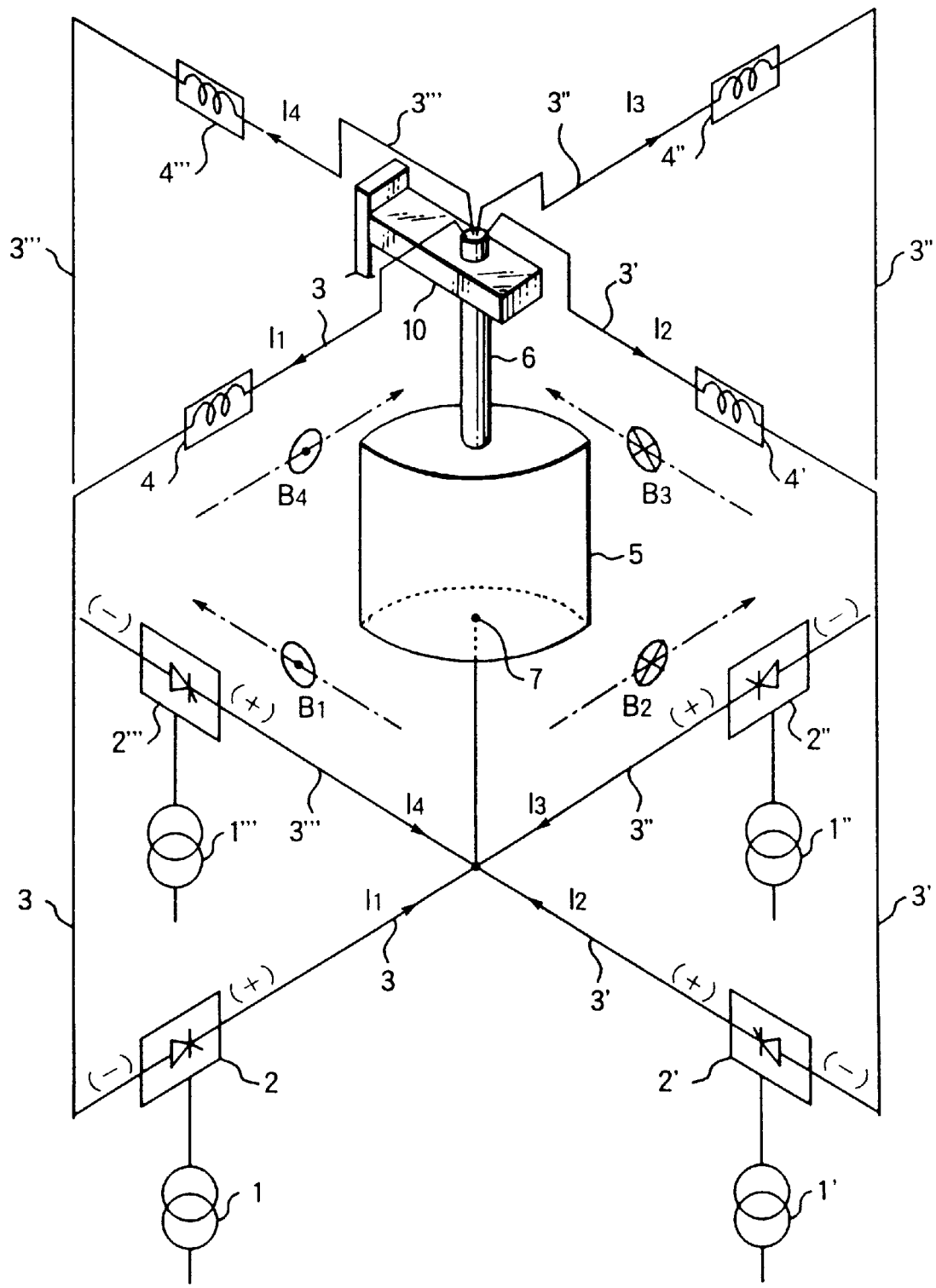
FIG. 21 is a schematic diagram illustrative of an eleventh embodiment of the arc control apparatus in accordance with the invention.

FIG. 21 shows the configuration of the arc control apparatus in accordance with the eleventh embodiment. The arc control apparatus is provided with four feeder circuits constructed by connecting in series one end of the smoothing reactor to the negative (−) electrode of the thyristor converter, which converts AC power into DC power, through the feeding conductors. These four circuits serve as the first through fourth feeder circuits which are laid out around the DC arc furnace 5 at intervals of 90 degrees with the movable electrode at the center. To be more specific about the arrangement of the feeder circuits, two feeding devices comprising the feeder circuit are disposed parallel to the feeder circuit on both sides at 180 degrees apart with the DC arc furnace 5 at the middle between and perpendicular to the feeder circuit on both sides at 90 degrees apart with the DC arc furnace 5 at the middle between them.

The feeding conductor indicated in this embodiment is used as the generic term for the conductors 3, 3', 3", and 3'" for connecting the movable electrode 6 with the smoothing reactors 4, 4', 4", and 4'", the conductors 3, 3', 3", and 3'" for connecting the smoothing reactors 4, 4', 4", and 4'" with the thyristor converters 2, 2', 2", and 2'", and the conductors 3, 3', 3", and 3'" for connecting the thyristor converters 2, 2', 2", and 2'" with the furnace bottom electrode 7; therefore, the feeding conductors 3, 3', 3", and 3'" will mean the feeding conductors in the description of this embodiment.

The first feeder circuit is constructed by connecting in series by the feeding conductor 3 the smoothing reactor 4 and the thyristor converter 2 with the furnace transformer 1 connected to the AC input thereof; the second feeder circuit is constructed by connecting in series by the feeding conductor 3' the smoothing reactor 4' and the thyristor converter 2' with the furnace transformer 1' connected to the AC input thereof; the third feeder circuit is constructed by connecting in series by the feeding conductor 3" the smoothing reactor 4" and the thyristor converter 2" with the furnace transformer 1" connected to the AC input thereof; and the fourth feeder circuit is constructed by connecting in series by the feeding conductor 3'" the smoothing reactor 4'" and the thyristor converter 2'" with the furnace transformer 1'" connected to the AC input thereof.

The ends on the other side of the smoothing reactors 4, 4', 4", and 4'" in the feeder circuits are commonly connected to the movable electrode 6, and the positive (+) electrodes of the thyristor converters 2, 2', 2", and 2'" are commonly connected to the furnace bottom electrode 7. DC currents I1, I2, I3, and I4 flowing through the feeding conductors 3, 3', 3", and 3'" generate magnetic fields B1, B2, B3, and B4. In this case, if DC currents I1, I2, I3, and I4 are equal, then the magnetic of fields B1, B2, B3, and B4 generated by the feeding conductors 3, 3', 3", and 3'" are equal in magnitude and different in direction by 90 degrees each; therefore, magnetic fields B1, B2, B3, and B4 cancel each other and do not interfere with the DC arc from the movable electrode 6.

Figure 22:
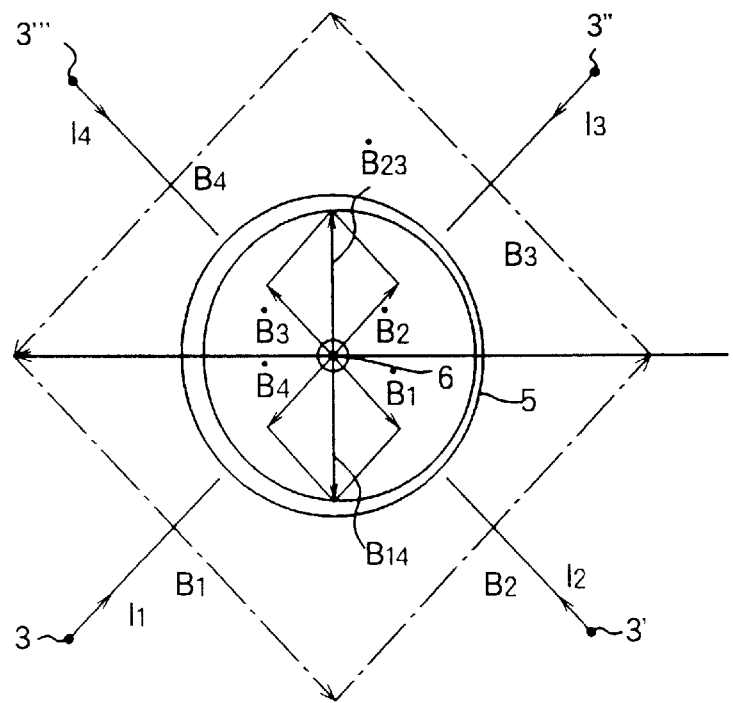
FIG. 22 is a vector diagram of a magnetic field for illustrating the operation of the eleventh embodiment.
Figure 23:
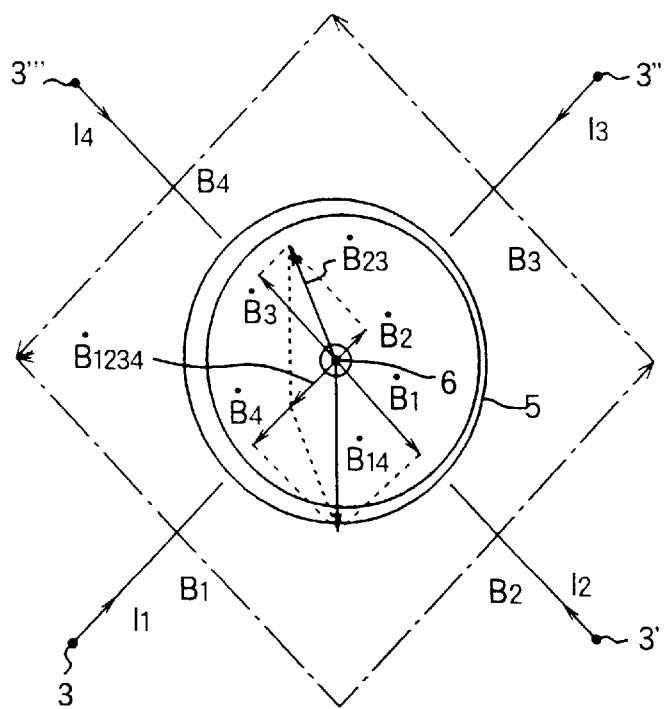
FIG. 23 is a vector diagram of a magnetic field for illustrating the operation of a twelfth embodiment.

FIG. 22 illustrates the vectors of magnetic fields B1, B2, B3, and B4 influencing the DC arc from the movable electrode in accordance with the eleventh embodiment. In the drawing, magnetic fields B1, B2, B3, and B4 generated by the feeding conductors 3, 3', 3", and 3'" provide the vectors which are equal in magnitude and different in direction by 90 degrees; therefore, magnetic fields B1, B2, B3, and B4 cancel each other and do not interfere with the DC arc from the movable electrode 6, enabling the DC arc to be generated vertically downward.

According to the construction of the eleventh embodiment, there is no need for a coil for generating a magnetic field and therefore, the feeding conductor system surrounding the furnace can be simplified and the DC arc discharge at the movable electrode arc generating point can be directed vertically downward.

Twelfth Embodiment

In the eleventh embodiment, the magnitude of DC currents I1, I2, I3, and I4 flowing by the feeding conductors 3, 3', 3", and 3'" are set to an equal value so that the magnitude of magnetic fields B1, B2, B3, and B4 generated by the feeding conductors 3, 3', 3", and 3'" may be the same. In the twelfth embodiment, the vectors of the magnetic fields are changed by controlling the magnitudes of DC currents I1, I2, I3, and I4 flowing through the feeding conductors 3, 3', 3", and 3'".

The twelfth embodiment is described with reference to FIG. 21. The embodiment is designed to control the magnitudes of DC currents I1, I2, I3, and I4 flowing through the feeding conductors 3, 3', 3", and 3'". If DC current I1 flowing through the feeding conductor 3 is not equal to DC currents I1, I2, I3, and I4 flowing through the feeding conductors 3, 3', 3", and 3'", then magnetic fields B1, B2, B3, and B4 generated by the feeding conductors 3, 3', 3", and 3'" are different in magnitude according to DC currents I1, I2, I3, and I4 and also different in direction by 90 degrees each. The operation of this embodiment will now be described in conjunction with the vector diagram given in FIG. 23.

For instance, if I1=I3=I4>I2, then magnetic fields B1 B2, B3, and B4 generated by the feeding conductors 3, 3', 3", and 3'" provide the vectors which have the magnitude expressed by B1=B3=B4>B2 and are different in direction by 90 degrees each. Resulting vector B1234 from B1, B2, B3, and B4 provides a force which has a force of B1234 magnitude in the direction of B4, causing the DC arc from the movable electrode to be subjected to the force of magnetic field which has the B1234 magnitude in the direction of B4. Thus, the DC arc from the movable electrode can be led in any direction by controlling DC currents I1, I2, I3, and I4.

According to the twelfth embodiment, the DC arc discharge at the movable electrode arc generating point can be directed vertically downward and also in any direction. Moreover, the DC arc discharge direction can be shifted to uniformly melt the object 11 to be melted in the furnace by changing DC currents I1, I2, I3, and I4 in sequence by virtue of the thyristor converters 2, 2', 2", 2'", respectively. Thus, the thyristor converters 2, 2', 2", 2'" comprise means for controlling the magnitude of a DC current supplied to the respective feeder circuits so as to allow the arc to be led into any desired direction.

Although in the description of the twelfth embodiment, four feeder circuits are disposed at intervals of 90 degrees around the arc furnace 5, any number of feeder circuits can be employed which are disposed in pairs in an opposed relation with respect to each other with the arc furnace 5 interposed therebetween so as to mutually cancel the magnetic fields with each other, which are produced at the arc generating point of the movable electrode 6 by the feeding conductors.

In the description given above, the auxiliary coils are all square; however, they may be in other shapes such as circular and oval shapes.

What is claimed is:

1. An arc deflection control apparatus comprising:
   an arc furnace in which an object to be melted may be disposed;
   a movable electrode disposed in said arc furnace for vertical movement toward and away from the object;
   feeder circuit means including power supply means and a feeding conductor connected to said arc furnace for supplying a current flowing between said arc furnace and said movable electrode from said power supply means through said feeding conductor to sustain an arc between said movable electrode and the object, melting the object; and
   auxiliary coil means disposed outside said arc furnace and connected in series with said feeder conductor between said power supply means and said arc furnace for generating a counter magnetic field cancelling a magnetic field generated by current flowing through said movable electrode upon generation of the arc, said auxiliary coil means having a first generally U-shaped turn lying in a plane parallel to said movable electrode.

2. The arc deflection control apparatus of claim 1 wherein said feeding conductor lies in a plane transverse to said movable electrode.

3. The arc deflection control apparatus of claim 1 comprising moving means for moving said auxiliary coil means in a vertical direction relative to said arc furnace as said movable electrode moves vertically.

4. The arc deflection control apparatus of claim 1 wherein said auxiliary coil means includes a second generally U-shaped turn, said first and second generally U-shaped turns lying in respective planes parallel to said movable electrode and located on opposite sides of said arc furnace.

5. The arc deflection control apparatus of claim 4 comprising moving means for moving said auxiliary coil means in a vertical direction relative to said arc furnace as said movable electrode moves vertically.

6. The arc deflection control apparatus of claim 4 wherein said first and second generally U-shaped turns are electrically connected in parallel.

7. An arc deflection control apparatus comprising:

an arc furnace in which an object to be melted may be disposed;

a movable electrode disposed in said arc furnace for vertical movement toward and away from the object;

feeder circuit means including power supply means and a feeding conductor connected to said arc furnace for supplying a current flowing between said arc furnace and said movable electrode from said power supply means through said feeding conductor to sustain an arc between said movable electrode and the object, melting the object; and auxiliary coil means disposed outside said arc furnace and connected in series with said feeder conductor between said power supply means and said arc furnace for generating a counter magnetic field cancelling a magnetic field generated by current flowing through said movable electrode upon generation of the arc, said auxiliary coil means having first and second coils lying in respective planes symmetrically disposed with respect to, and oblique to, said movable electrode and located on opposite sides of said arc furnace.

8. The arc deflection control apparatus of claim 7 wherein said feeding conductor lies in a plane transverse to said movable electrode.

9. The arc deflection control apparatus of claim 7 comprising moving means for moving said auxiliary coil means in a vertical direction relative to said arc furnace as said movable electrode moves vertically.

10. The arc deflection control apparatus of claim 7 wherein said first and second coils are electrically connected in parallel.

11. An arc deflection control apparatus comprising:

an arc furnace in which an object to be melted may be disposed;

a movable electrode disposed in said arc furnace for vertical movement toward and away from the object;

feeder circuit means including first and second power supply means and first and second feeding conductors connected to said arc furnace for respectively supplying first and second currents flowing between said arc furnace and said movable electrode from said first and second power supply means through said first and second feeding conductors to generate an arc between said movable electrode and the object, melting the object; and auxiliary coil means disposed outside said arc furnace and including first and second coils, said first coil being connected in series with said first feeder conductor and said second coil being connected in series with said second feeder conductor, for generating a counter magnetic field cancelling a magnetic field generated by current flowing upon generation of the arc, said first and second coils lying in respective planes parallel to said movable electrode and located on opposite sides of said arc furnace.

12. The arc deflection control apparatus of claim 11 wherein said first and second feeding conductors lie in at least one plane transverse to said movable electrode.

13. The arc deflection control apparatus of claim 11 comprising moving means for moving said auxiliary coil means in a vertical direction relative to said arc furnace as said movable electrode moves vertically.

14. The arc deflection control apparatus of claim 11 wherein:

said feeder circuit means includes third and fourth power supply means and third and fourth feeding conductors lying in at least one plane transverse to said movable electrode and connected to said arc furnace for respectively supplying third and fourth currents flowing between said arc furnace and said movable electrode from said third and fourth power supply means through said third and fourth feeding conductors; and said auxiliary coil means includes third and fourth coils, said third coil being connected in series with said third feeder conductor and said fourth coil being connected in series with said fourth feeder conductor for generating a counter magnetic field cancelling the magnetic field generated by current flowing upon generation of the arc, said third and fourth coils lying in respective planes parallel to said movable electrode, said first, second, third, and fourth coils being equally spaced around said arc furnace.

15. The arc deflection control apparatus of claim 14 comprising moving means for moving said auxiliary coil means in a vertical direction relative to said arc furnace as said movable electrode moves vertically.

\* \* \* \* \*